United States Patent
Dickinson et al.

(10) Patent No.: US 9,310,888 B2
(45) Date of Patent: Apr. 12, 2016

(54) MULTIMODAL LAYOUT AND RENDERING

(75) Inventors: Richard Lee Dickinson, Seattle, WA (US); Indrojit Deb, Sammamish, WA (US); Ramanathan Ananthanarayan Pallassana, Sammamish, WA (US); Christian Heydemann, Kirkland, WA (US); Anastasia Paushkina, Redmond, WA (US); Ted Cyrek, Sammamish, WA (US); Bharath Swaminathan, Seattle, WA (US); Michael J. McCormack, Snohomish, WA (US); Ron Mondri, Bellevue, WA (US); Patrick O'Brien, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 136 days.

(21) Appl. No.: 13/541,785

(22) Filed: Jul. 5, 2012

(65) Prior Publication Data
US 2013/0241951 A1     Sep. 19, 2013

Related U.S. Application Data

(60) Provisional application No. 61/612,148, filed on Mar. 16, 2012.

(51) Int. Cl.
G06F 3/01        (2006.01)
G06F 3/0484    (2013.01)
G06F 3/0488    (2013.01)

(52) U.S. Cl.
CPC .............. *G06F 3/017* (2013.01); *G06F 3/0488* (2013.01); *G06F 3/04842* (2013.01)

(58) Field of Classification Search
CPC ...... G09G 5/00; G06F 3/0488; G06F 3/04886
USPC .......... 345/619; 715/234–253, 273–277, 760, 715/762–763, 864, 867, 772
See application file for complete search history.

(56) References Cited

U.S. PATENT DOCUMENTS

| | | |
|---|---|---|
| 5,297,032 A | 3/1994 | Trojan et al. |
| 5,321,750 A | 6/1994 | Nadan |
| 5,339,392 A | 8/1994 | Risberg et al. |
| 5,819,284 A | 10/1998 | Farber et al. |
| 5,836,011 A | 11/1998 | Hambrick et al. |

(Continued)

FOREIGN PATENT DOCUMENTS

WO    9926127 A1    5/1999

OTHER PUBLICATIONS

Meike, Multi-platform fragments, Jun. 22-23, 2011, Portable Droid, Part I pp. 1-7.*

(Continued)

*Primary Examiner* — Haixia Du
(74) *Attorney, Agent, or Firm* — Thomas Marquis; Kate Drakos; Micky Minhas

(57) ABSTRACT

A layout transformation system accesses application metadata that defines a plurality of different structures for displaying components of the application, based upon the particular modality of the display device. The layout transformation system then transforms a user interface display based on the application metadata and based upon the particular modality, and provides the user interface display to the display device for rendering and user interaction.

19 Claims, 28 Drawing Sheets

(56) References Cited

U.S. PATENT DOCUMENTS

| | | | |
|---|---|---|---|
| 5,959,621 | A | 9/1999 | Nawaz et al. |
| 6,111,573 | A * | 8/2000 | McComb et al. ............ 715/763 |
| 6,188,405 | B1 | 2/2001 | Czerwinski et al. |
| 6,216,141 | B1 | 4/2001 | Straub et al. |
| 6,278,448 | B1 | 8/2001 | Brown et al. |
| 6,311,058 | B1 | 10/2001 | Wecker et al. |
| 6,449,638 | B1 | 9/2002 | Wecker et al. |
| 6,456,334 | B1 | 9/2002 | Duhault |
| 6,510,553 | B1 | 1/2003 | Hazra |
| 6,724,403 | B1 | 4/2004 | Santoro et al. |
| 6,832,355 | B1 | 12/2004 | Duperrouzel et al. |
| 6,842,176 | B2 | 1/2005 | Sang'udi et al. |
| 6,976,210 | B1 | 12/2005 | Silva et al. |
| 7,028,264 | B2 | 4/2006 | Santoro et al. |
| 7,082,576 | B2 * | 7/2006 | Shahine et al. ............... 715/789 |
| 7,216,351 | B1 | 5/2007 | Maes |
| 7,376,907 | B2 | 5/2008 | Santoro et al. |
| 7,895,522 | B2 | 2/2011 | Wong et al. |
| 7,933,632 | B2 | 4/2011 | Flynt et al. |
| 7,987,431 | B2 | 7/2011 | Santoro et al. |
| 8,176,096 | B2 | 5/2012 | Allyn et al. |
| 8,195,245 | B2 * | 6/2012 | Wang et al. ................... 455/566 |
| 8,244,851 | B1 | 8/2012 | Postoaca |
| 8,601,019 | B1 * | 12/2013 | Weininger et al. ............ 707/769 |
| 8,949,707 | B2 * | 2/2015 | Lee et al. ........................ 715/234 |
| 2002/0084991 | A1 | 7/2002 | Harrison et al. |
| 2004/0073571 | A1 * | 4/2004 | Kumhyr et al. ............ 707/104.1 |
| 2004/0093343 | A1 | 5/2004 | Lucas et al. |
| 2004/0141508 | A1 | 7/2004 | Schoeneberger et al. |
| 2004/0162800 | A1 | 8/2004 | Reid et al. |
| 2004/0179042 | A1 * | 9/2004 | Bear et al. ..................... 345/840 |
| 2004/0210468 | A1 | 10/2004 | Rubel et al. |
| 2004/0230905 | A1 * | 11/2004 | Asakawa et al. .............. 715/517 |
| 2004/0254805 | A1 | 12/2004 | Schwerin-Wenzel et al. |
| 2005/0075917 | A1 | 4/2005 | Flores et al. |
| 2005/0143124 | A1 * | 6/2005 | Kennedy et al. ............ 455/556.1 |
| 2005/0183010 | A1 * | 8/2005 | Iwasaki ......................... 715/517 |
| 2005/0195217 | A1 * | 9/2005 | Robertson et al. ............ 345/619 |
| 2006/0026502 | A1 | 2/2006 | Dutta |
| 2006/0031178 | A1 | 2/2006 | Lehrman et al. |
| 2006/0075337 | A1 | 4/2006 | Jones et al. |
| 2006/0080468 | A1 | 4/2006 | Vadlamani et al. |
| 2006/0190833 | A1 | 8/2006 | SanGiovanni et al. |
| 2006/0235884 | A1 | 10/2006 | Pfenninger et al. |
| 2007/0074121 | A1 * | 3/2007 | Mullender et al. ............ 715/744 |
| 2007/0100845 | A1 | 5/2007 | Sattler et al. |
| 2007/0211293 | A1 * | 9/2007 | Komamura ................... 358/1.18 |
| 2008/0065675 | A1 * | 3/2008 | Bozich et al. ................. 707/102 |
| 2008/0086265 | A1 * | 4/2008 | Heuser .......................... 701/211 |
| 2008/0229212 | A1 * | 9/2008 | Miyazaki ...................... 715/744 |
| 2009/0006948 | A1 | 1/2009 | Parker et al. |
| 2009/0070333 | A1 | 3/2009 | Bailey |
| 2009/0070744 | A1 | 3/2009 | Taylor et al. |
| 2009/0076878 | A1 | 3/2009 | Woerner et al. |
| 2009/0100321 | A1 | 4/2009 | Singh et al. |
| 2009/0125818 | A1 | 5/2009 | Ritter et al. |
| 2009/0171659 | A1 | 7/2009 | Pearce et al. |
| 2010/0070323 | A1 | 3/2010 | Polcari et al. |
| 2010/0082706 | A1 * | 4/2010 | Lim .............................. 707/809 |
| 2010/0088630 | A1 * | 4/2010 | Morris .......................... 715/781 |
| 2010/0100825 | A1 | 4/2010 | Sharoni |
| 2010/0114698 | A1 * | 5/2010 | Goel et al. .................. 705/14.49 |
| 2010/0162171 | A1 | 6/2010 | Felt et al. |
| 2010/0302278 | A1 * | 12/2010 | Shaffer et al. ................. 345/659 |
| 2010/0302595 | A1 * | 12/2010 | Yamada et al. ............... 358/1.18 |
| 2011/0078184 | A1 | 3/2011 | Song et al. |
| 2011/0087990 | A1 | 4/2011 | Ng et al. |
| 2011/0099042 | A1 | 4/2011 | Yerkes |
| 2011/0175826 | A1 | 7/2011 | Moore et al. |
| 2011/0214067 | A1 * | 9/2011 | Tanaka .......................... 715/745 |
| 2011/0225547 | A1 | 9/2011 | Fong et al. |
| 2011/0275418 | A1 | 11/2011 | Forstall et al. |
| 2011/0283231 | A1 | 11/2011 | Richstein et al. |
| 2011/0296312 | A1 | 12/2011 | Boyer et al. |
| 2011/0307948 | A1 | 12/2011 | Ranjan et al. |
| 2011/0313805 | A1 | 12/2011 | Heydemann et al. |
| 2012/0030627 | A1 | 2/2012 | Nurmi et al. |
| 2012/0036204 | A1 | 2/2012 | Cole |
| 2012/0047139 | A1 * | 2/2012 | Fitzer et al. ................... 707/737 |
| 2012/0072260 | A1 | 3/2012 | Graham et al. |
| 2012/0144309 | A1 | 6/2012 | Zendler et al. |
| 2012/0168492 | A1 * | 7/2012 | Herbst et al. .................. 235/375 |
| 2012/0192090 | A1 | 7/2012 | Patterson et al. |
| 2012/0254791 | A1 * | 10/2012 | Jackson et al. ................ 715/781 |
| 2012/0290351 | A1 | 11/2012 | Bear et al. |
| 2013/0007586 | A1 * | 1/2013 | Thomas ........................ 715/234 |
| 2013/0033523 | A1 * | 2/2013 | Stovicek et al. .............. 345/649 |
| 2013/0154947 | A1 * | 6/2013 | Abrams et al. ................ 345/173 |
| 2013/0159971 | A1 * | 6/2013 | Gieselmann et al. ......... 717/120 |
| 2013/0167110 | A1 * | 6/2013 | Gross et al. ................... 717/105 |
| 2013/0227461 | A1 | 8/2013 | Berger et al. |
| 2013/0241852 | A1 | 9/2013 | McCormack et al. |
| 2013/0246111 | A1 | 9/2013 | McCormack et al. |
| 2013/0246913 | A1 | 9/2013 | McCormack et al. |
| 2013/0246930 | A1 | 9/2013 | Paushkina et al. |
| 2013/0286410 | A1 * | 10/2013 | Yasinover et al. ............. 358/1.2 |

OTHER PUBLICATIONS

Meike, Multi-platform fragments, Jun. 22-23, 2011, Portable Droid, Part II pp. 1-6.*
Derwent abstract of US 2010/0114698 A1.*
Francis, Get Started with Android fragments, Mar. 14, 2012, http://www.techrepublic.com/blog/software-engineer/get-started-with-android-fragments, pp. 1-12.*
Francis, Get Started with Android fragments, Mar. 14, 2012, http://www.techrepublic.com/blog/software-engineer/get-started-with-android-fragments, pp. 1-13.*
Mueller, et al., "Interactive Multimodal User Interfaces for Mobile Devices", Retrieved at <<http://ieeexplore.ieee.org/stamp/stamp.jsp?tp=&arnumber=1265674>>, In Proceedings of the 37th Hawaii International Conference on System Sciences, Jun. 5, 2004, pp. 12.
Niklfeld, et al., "Device independent mobile multimodal user interfaces with the MONA Multimodal Presentation Server", Retrieved at <<http://citeseerx.ist.psu.edu/viewdoc/download?doi=10.1.1.84.6680&rep=rep1&type=pdf>>, In Proceedings of Eurescom Summit 2005, Heidelberg, Germany, Apr. 28, 2005, pp. 8.
Paterno, Fabio, "Multimodality and Multi-device Interfaces", Retrieved at <<http://www.w3.org/2004/02/mmi-workshop/paterno-cnr.pdf>>, In Proceedings of W3C workshop on Multimodal Interaction, Jul. 20, 2004, pp. 4.
Schaefer, et al., "Dialog Modeling for Multiple Devices and Multiple Interaction Modalities", Retrieved at <<http://mitglied.multimania.de/robbie/data/tamodia_rs_sb_wm.pdf>>, In Proceeding of the 5th International Workshop, Task Models and Diagrams for Users Interface Design (TAMODIA) 2006, Hasselt, Belgium, Oct. 23, 2006, pp. 16.
Mayora-Ibarra, Oscar, "Generation of Device Independent User Interfaces", Retrieved at <<http://uhdonline.dt.uh.edu/academic/colleges/sciences/ccsds/grants/mexico/papers/4view/9/mayora.pdf>>, In Proceedings of the International Workshop on Research and Development of Human Communication Technologies for Conversational Interaction and Learning, Puebla, Mexico, Jan. 2002, pp. 3.
Wardley et al., "Next-Generation CRM: Driving Productivity with End-to-End Cloud Services", Retrieved at <<http://az26122.vo.msecnd.net/docs/NextGenCRM_DrivingProductivity(229357).pdf>>, Microsoft Dynamics CRM, Jul. 2011, 20 pages.
"PeopeSoft 8 CRM Interaction Management PeopleBook", Retrieved at <<http:/docs.oracle.com/cd/B28702_01/psft/acrobat/crmr8ccic-b0601.pdf>>. Jun. 2001, 34 pages.
"Closing the Deal: the Oracle Fusion Customer Relationship Management User Experience", Retrieved at <<http://www.oracle.com/webfolder/ux/applications/Fusion/whitepaper_pdf/Oracle-Fusion-Customer-Relationship-Management_latest_draft_September_2011.pdf>>, Oracle Fusion Application, Sep. 2011, 18 pages.
Chan, Yong Hua, "Gesture-Based OLAP Navigation on Touchscreen Devices". Retrieved at <<http://repository.tudelft.nl/assets/uuid:f5c7d8ca-febb-4531-bafe-de416c24ac7d/Yong_Hua_Chan_Gesture-Based_OLAP_Navigation_on_Touchscreen_Devices.

(56) References Cited

OTHER PUBLICATIONS pdf>>, A Thesis, Submitted in Partial Fulfillment of the Requirements for the Degree of Master of Science in Computer Science, Sep. 21, 2012, 99 pages.

Nitsche et al., "Vague Query Formulation by Design". Retrieved at <<http://red.cs.nott.ac.uk/~mlw/EuroHCIR2012/poster13.pdf>>, In Proceedings of the 2nd European Workshop on Human-Computer Interaction and Information Retrieval, Aug. 25, 2012, 4 pages.

"Design case study: Enterprise line of business Windows Store app (Windows)", Retrieved at <<http://msdn.microsoft.com/en-us/library/windows/apps/jj659079.aspx>>. Retrieved Date. Feb. 25, 2013, 17 pages.

"Raise the Bar on Both Business Intelligence and Web UI with Silverlight", Retrieved at <<http://www.infragistics.com/products/silverlight/>>, Retrieved Date: Feb. 25, 2013, 4 pages.

Non-Final Office Action for U.S. Appl. No. 13/827,759 dated Jun. 10, 2015, 17 pages.

Prosecution History for U.S. Appl. No. 13/754,896 including: Amendment dated Feb. 23. 2015 and Non-Final Office Action dated Nov. 6, 2014, 32 pages.

Non-Final Office Action for U.S. Appl. No. 13/827,813 dated Apr. 22, 2015, 16 pages.

Non-Final Office Action for U.S. Appl. No. 13/773,630 dated Apr. 29, 2015, 21 pages.

Prosecution History for U.S. Appl. No. 13/754,896 including: Amendment with RCE dated Oct. 8, 2015 and Final Office Action dated Jul. 8, 2015, 41 pages.

"Yelp for Android-App review," available at https://www.youtube.com/watch?v=7vP3w_4mh-s, posted: May 4, 2011; Duration:2m28s, 1 page.

Amendment for U.S. Appl. No. 13/773,830 dated Jul. 10, 2015, 66 pages.

Prosecution History for U.S. Appl. No. 13/827,759 including: Applicant Initiated Interview Summary dated Sep. 3, 2015 and Amendment dated Aug. 31, 2015, 18 pages.

Amendment for U.S. Appl. No. 13/827,813 dated Sep. 9, 2015, 12 pages.

Non-Final Office Action for U.S. Appl. No. 13/773,630 dated Oct. 15, 2015, 27 pages.

Final Office Action for U.S. Appl. No. 13/827,759 dated Nov. 25, 2015, 16 pages.

Final Office Action for U.S. Appl. No. 13/827,813 dated Nov. 27, 2015, 21 pages.

* cited by examiner

FIG. 6A

What's New

Acme
Lorem ipsum lorem ipsum
5 minutes ago

Paul McConnell
Contact phone number was changed by
4516 to 345-4125
10 minutes ago Contoso
Opportunity Possible 100 seat deal ...clo
Victor Franco
3 hours ago

ACME CORP $34,000

MULTIMODAL LAYOUT AND RENDERING

The present application is based on and claims the benefit of U.S. provisional patent application Ser. No. 61/612,148, filed Mar. 16, 2012, the content of which is hereby incorporated by reference in its entirety.

BACKGROUND

In current computing environments, there are a wide range of different types of devices for running applications. Each of the different devices can have display screens of different resolutions, they can use different input mechanisms, they can have display screens of different sizes, they can use different aspect ratios, etc. Some such devices include smart phones, multimedia players, cellular phones, tablet computers, desktop computers, laptop computers, and other devices, including other mobile devices.

Given all these types of devices, it can be difficult to design or customize a user interface to an application. In fact, many current systems require separate designs for each type of device (or device category). The current designs also increase or decrease the size of displayed items in a fixed way between different device environmental definitions. In fact, current systems are quite limited in their ability to adapt to different screen sizes. For instance, they are quite limited in their ability to stretch or grow a display, or to shrink or reduce the display, in a meaningful way, when the display is shown on different types of devices.

This problem can even be exacerbated in certain environments. For instance, people who use business applications for their work are tending, more and more, to use different types of devices to do their work. For instance, there is an increasing number of workers who use mobile devices, such as tablet computers or smart phones, with increasing frequency, to run business applications. They perform their work either at their work location, or from a remote location. These same workers often use desktop computers to run the same applications, as well. Therefore, a single worker may use multiple different types of devices to run the same business application in order to do his or her work. This makes designing a user interface to that application even more difficult.

The discussion above is merely provided for general background information and is not intended to be used as an aid in determining the scope of the claimed subject matter.

SUMMARY

A layout transformation system accesses application metadata that defines a plurality of different structures for displaying components of the application, based upon the particular modality of the display device. The layout transformation system then transforms a user interface display based on the application metadata and based upon the particular modality, and provides the user interface display to the display device for rendering and user interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6A-6M show another set of exemplary user interface displays.

DETAILED DESCRIPTION

Figure 1:
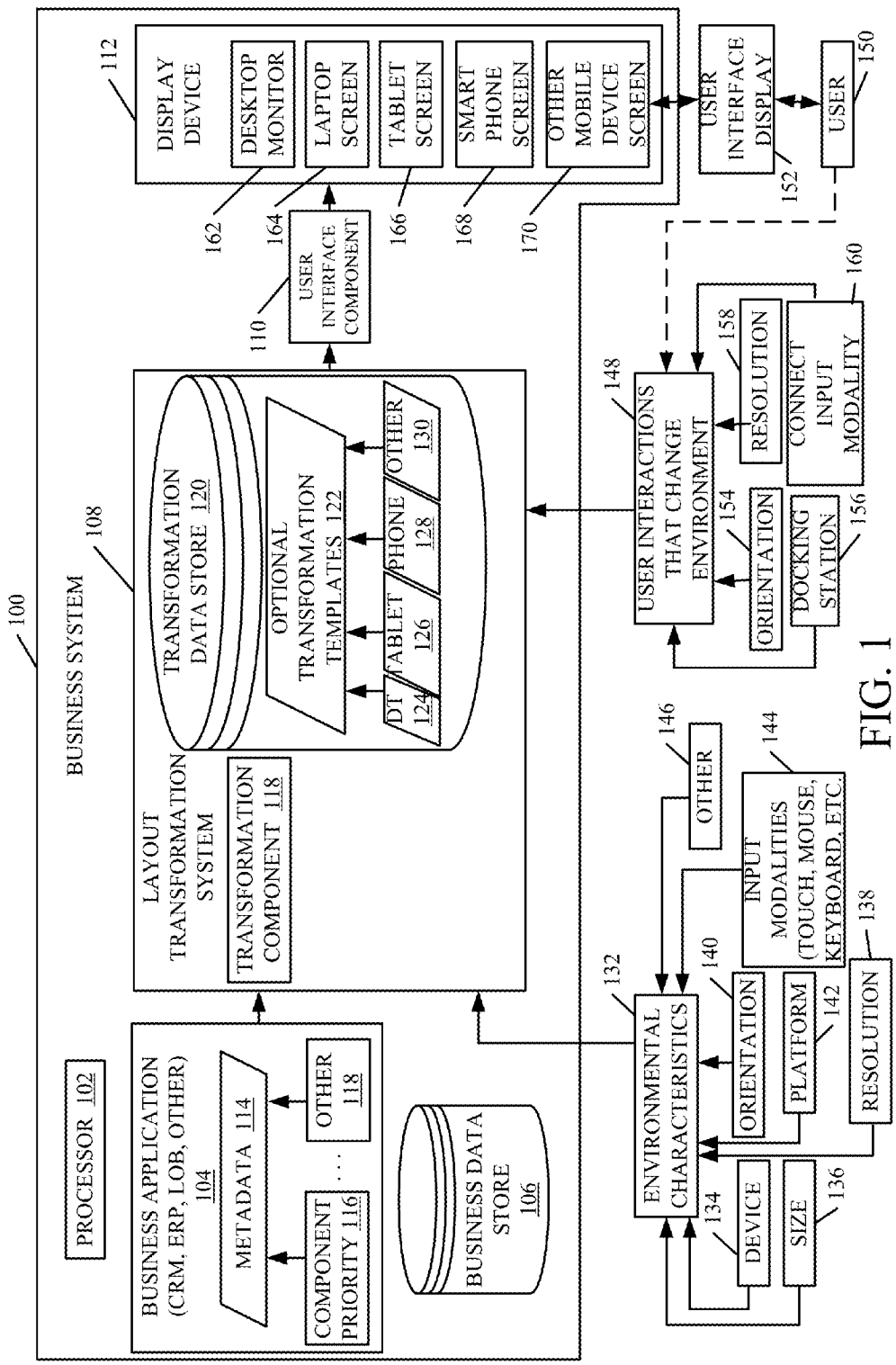
FIG. 1 is a block diagram of one illustrative embodiment of a business system.

FIG. 1 is a block diagram of one illustrative business system 100. Business system 100 includes processor 102, business application 104, business data store 106, layout transformation system 108, user interface component 110, and display device 112. In the embodiment illustrated, processor 102 is illustratively a computer processor with associated memory and timing circuitry (not shown) that forms a functional part of system 100 and is activated by, and facilitates the functionality of, the other components, applications and systems in business system 100.

Business application 104 is illustratively a customer resource management (CRM) application, an enterprise resource planning (ERP) application, a line of business (LOB) application or some other type of business application. It illustratively includes metadata 114, such as component priority metadata 116 and other metadata 118 that defines a meta-structure for display components in business application 104.

Business data store 106 illustratively stores business data records that are accessed and manipulated by application 104. The data records can be objects or entities or other data records.

Layout transformation system 108 illustratively includes transformation component 118 and transformation data store 120. Transformation data store 120, itself, can include optional transformation templates 122 that can be used to assist in transforming the layout and display of a user interface for different types of devices. Therefore, templates 122 can include desktop templates 124, tablet templates 126, phone templates 128, and other templates 130.

FIG. 1 also shows that business system 100 illustratively receives environmental characteristics 132. The environmental characteristics 132 illustratively define a modality of the particular device that is being used to display the user interface displays. In the embodiment shown in FIG. 1, environmental characteristics 132 include a device definition 134 that defines the device, a display size 136 that defines the size of the display screen on the device, resolution 138 that indicates the resolution of the display screen, orientation 140 that describes the orientation of the device (such as whether it is displaying in a landscape or portrait orientation), platform characteristics 142 that define the platform used to generate the display, input modalities 144 that define the particular input modalities available on the device that is being used to generate the display. Some such input modalities include, by way of example, a touch screen, a mouse, a keyboard, etc. Environmental characteristics 132 also illustratively include any other desired characteristics 146.

FIG. 1 also shows that layout transformation system 108 can illustratively receive user interactions that change the environmental characteristics 132. These interactions are indicated schematically by number 148 in FIG. 1. The user interactions are illustratively received from user 150 through user interface display 152. Display 152 illustratively includes user input mechanisms that receive user inputs for interaction with business system 100, and application 104. Alternatively, user interactions 148 can be provided by various sensors or other input mechanisms on the particular display device 112 used to generate the user interface display. In any case, some examples of user interactions that can change environmental characteristics 132 include an orientation input 154 that changes the orientation of the input device. For instance, when a tablet computer is changed from a landscape orientation to a portrait orientation, that will change the orientation environmental characteristic. If user 150 places display device 112 in a docking station, that can also change the environmental characteristics 132, and this is indicated by block 156 in FIG. 1. User 150 may also provide an input 158 to change the resolution of the device, or the user 150 can connect the display device to a different input modality (such as connecting a mouse, a microphone, or another input modality to the display device 112). This is indicated by block 160 in FIG. 1.

FIG. 1 also shows that display device 112 can be any of a wide variety of different display devices, such as a desktop monitor 162, a laptop screen 164, a tablet screen 166, a smart phone screen 168, or another mobile device or another display device 170. These are given by way of example only.

For the sake of the present description, the term "display component" means a visual representation of data contained within the display component, wherein the display component contains sufficient metadata that it can render itself, without additional metadata. Some examples of display components include lists, tiles, charts, images, etc. In addition, as used in the present description, a "canvas section" is a unit of layout on a display screen that can hold one or more components. For example, a tablet display screen 166 may have three different canvas sections (or columns) in which display components may be displayed. Similarly, a smart phone display screen 168 may have only one canvas section. Alternatively, of course, each of the display screens can render displays in different complexities. A tablet display screen rendering a low complexity display may have only one canvas section, while a tablet display screen rendering a high complexity display may have three or more canvas sections. It will simply be understood, for the sake of the present description, a canvas section is a unit of layout on a display screen that can hold one or more display components.

The operation of system 100 is described below in greater detail with respect to FIGS. 2-4. Briefly, however, by way of overview, user 150 illustratively provides user inputs to system 100 to generate a display of a display component on the particular display device that user 150 is using. If the user 150 is using a desktop computer, the display device may be a desktop monitor 162. Alternatively, if the user 150 is using a smart phone, then the display device will be a smart phone screen 168, etc. The display device 112 will illustratively be the display device for the particular device user 150 is using at the time.

In any case, assuming that user 150 has provided an input requesting the display of information (such as an entity stored in business data store 106), transformation component 118 illustratively receives environmental characteristics 132 that define the environment where the particular user interface display will be rendered. It can be obtained by transformation component 118 by either interrogating the device, or by simply accessing the information in a different way. Transformation component 118 also illustratively interrogates the particular display component, that is to be displayed, for its metadata 114. Metadata 114 illustratively defines how the particular display component is to be displayed, given the various environmental characteristic 132 that are present. Transformation component 118 can optionally access transformation templates 122 to obtain additional information as to how to render the given display component requested by user 150 on the particular display device, given the environmental characteristics and the metadata 114 corresponding to the display component. Transformation component 118 then uses user interface component 110 to generate a user interface display for the particular display device 112, based on the environmental characteristics and the component metadata, and optionally based upon a transformation template. The user interface display is provided to the display device where it is rendered and displayed as user interface display 152 for review and interaction by user 150. Of course, if user 150 provides a user interaction that changes any of the environmental characteristics, then transformation component 118 transforms the user interface display again, based upon the updated or revised environmental characteristics.

Figure 2:
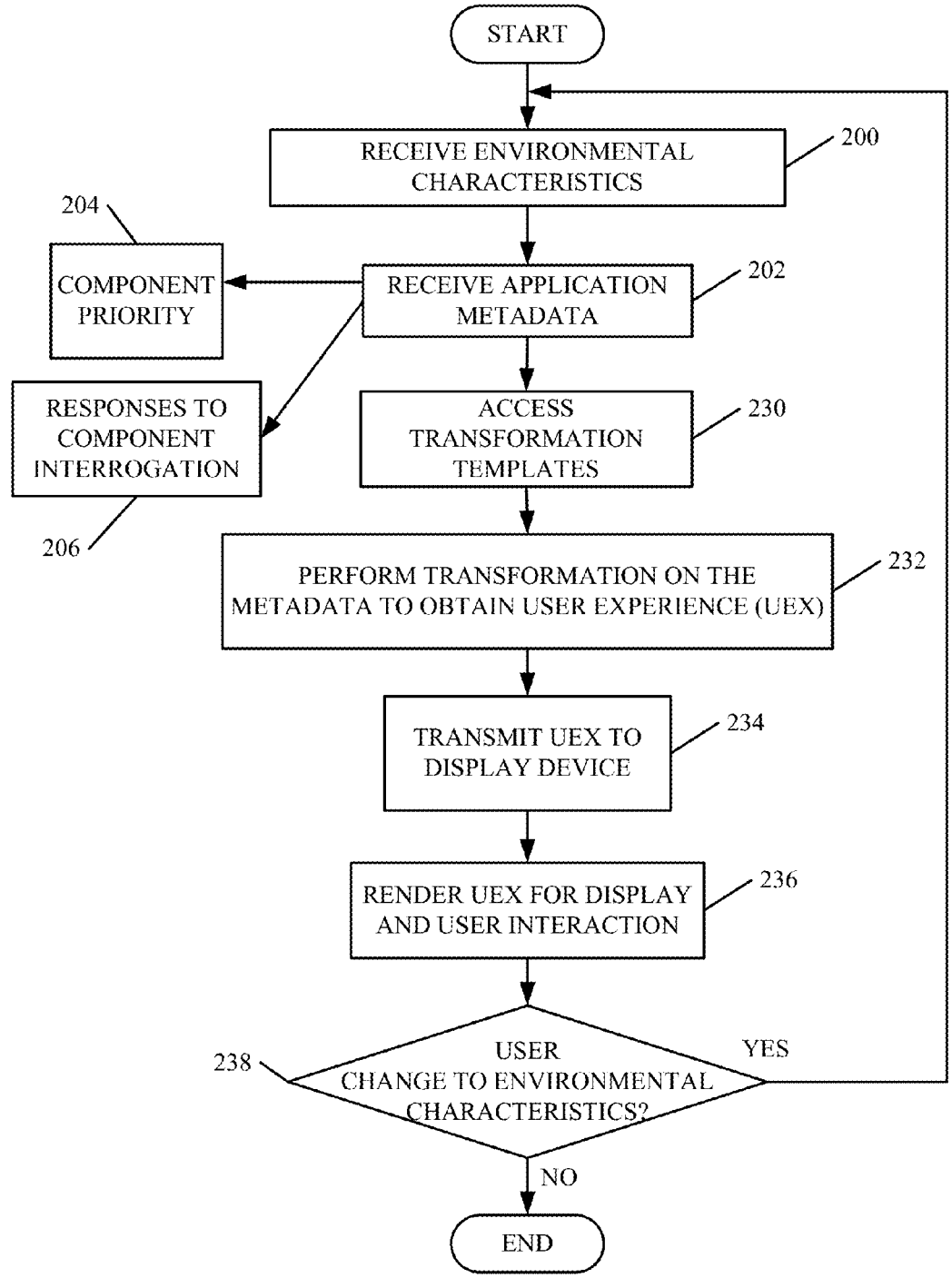
FIG. 2 is a flow diagram illustrating one embodiment of the operation of a layout transformation system.

FIG. 2 is a block diagram illustrating the operation of layout transformation system 108, in generating a user experience or user interface display, in more detail. FIG. 2 shows that system 108 first receives the environmental characteristics 132. As briefly discussed above, environmental characteristics 132 can include characteristics such as those shown with numerals 134-146, or other characteristics. The characteristics define the display environment where the user interface display is to be displayed to a user. Receiving the environmental characteristics is indicated by block 200 in FIG. 2.

Transformation component 118 then receives application metadata 114. This is indicated by block 202 in FIG. 2. In one embodiment, each display component in application 104 has corresponding metadata 114 that not only indicates a component priority 204, but also includes metadata that can be provided in response to component interrogation by transformation component 118. This is indicated by block 206 in FIG. 2.

Figure 3:
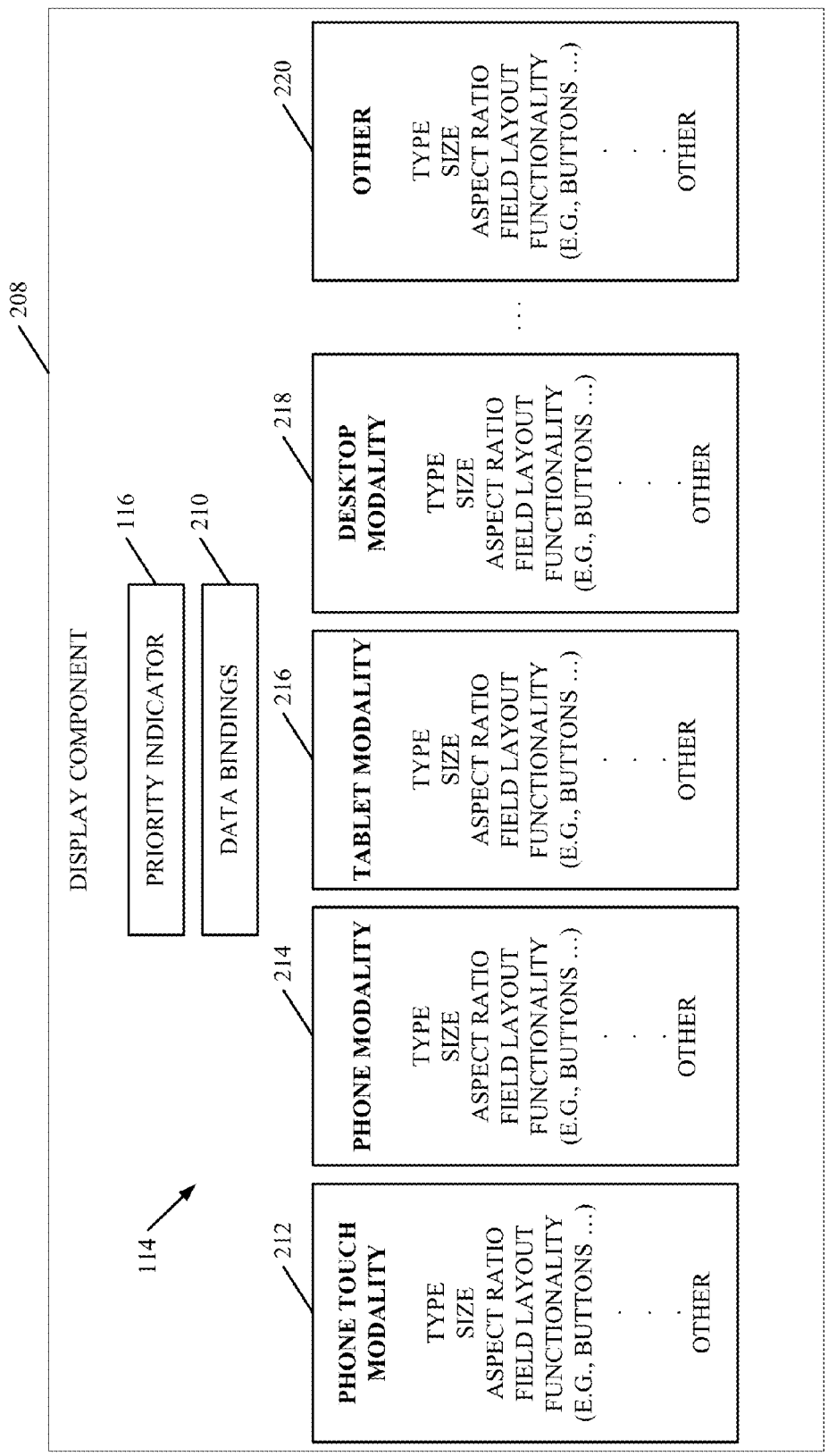
FIG. 3 is a block diagram showing one embodiment of a component with metadata.

By way of example, FIG. 3 shows a block diagram of one illustrative display component 208 and its corresponding metadata 114. Metadata 114 includes priority indicator 116, data bindings 210, and a plurality of different kinds of modality metadata. In the example shown in FIG. 3, component 208 includes phone touch modality metadata 212, phone modality metadata 214, tablet modality metadata 216, desktop modality metadata 218 and other modality metadata 220. Each set of modality metadata 212-220 illustratively includes metadata that indicates how display component 208 is to be laid out and rendered on a display screen for a display device corresponding to the given modality. For instance, metadata 212 provides information indicating how display component 208 is to be laid out and displayed on a smart phone with a touch screen. Modality metadata 214 indicates how display component 208 is to be laid out and displayed on a smart phone that does not have a touch screen. Metadata 216 indicates how display component 208 is to be laid out and displayed on a tablet display screen, while metadata 218 contains metadata that indicates how display component 208 is to be laid out and displayed on a desktop computer display. Of course, other modality metadata 220 can be provided for other types of modalities, as desired.

The types of metadata on each set of metadata 212-220 can be the same for each modality, or it can be specific to the given modality corresponding to that metadata. By way of example, phone touch modality metadata 212 includes type, size, aspect ratio, field layout, functionality, and other metadata. In order to illustrate the types of metadata that can be included, it is assumed for the sake of present discussion that display component 208 is a chart of orders for a customer entity stored in business data store 106 in FIG. 1. The chart of orders illustratively shows the various orders placed by a given customer over time. In that case, priority indicator 116 indicates the priority of the chart display component 208 when the user requests display of the customer entity. The customer entity may include things such as a contact list, the chart of orders, the address for the customer, and other related information. Each of those items of related information may be represented by a different component, such as a chart, a list of contacts, an address card, etc. Priority indicator 116 indicates the priority, among the various display components corresponding to the selected entity. Transformation component 118 shown in FIG. 1 can thus ensure that higher priority display components are displayed in a preferential fashion, even as the particular type of display device being used changes.

Data bindings 210 identify the particular data records that are bound to display component 208. For example, where display component 208 is a chart of orders, the data bindings 210 will identify the specific data records where the orders are held within business data store 106. Therefore, when display component 208 is rendered, the data bound to display component 208 can be retrieved and rendered as well.

For a smart phone with a touch sensitive screen, metadata 212 is used. In that embodiment, the type of chart corresponding to display component 208 may be a bar chart. Alternatively, if the display is a larger display, such as a desktop display, then desktop modality metadata 218 is used and the type of chart may be a pie chart or a different type of chart.

The size metadata indicates the overall size of display component 208 in pixels. This is exemplary only. In another example, a different unit of measure can be used, other than pixels. This can be done, for instance, to accommodate difficulties arising from different resolutions (and different pixels per inch) on different devices. Therefore, as the particular modality used to display component 208 changes, the size metadata will change as well.

The aspect ratio metadata provides information on how to display component 208 given different aspect ratios. This can be done in any desired way.

Field layout metadata 212 provides instructions on how the various fields in display component 208 are to be laid out on the display screen. For example, if display component 208 is a bar chart, the field layout metadata may indicate that the dates are to be laid out on the x axis while the total number of orders is to be laid out along the y axis of the bar chart. This is given by way of example only.

Similarly, the functionality metadata indicates what types of user interface functionality are to be provided on the bar chart which comprises display component 208. If the modality is the phone touch modality metadata 212, the functionality metadata may indicate that no buttons are initially provided on the bar chart, but when the user swipes his or her finger in a given direction, then manipulation buttons appear that can change the size of the chart, the granularity of the chart, etc. Alternatively, if the modality is a desktop modality, then desktop modality metadata 218 may indicate that the buttons are initially displayed next to the bar chart which comprises display component 208, because there is more display real estate available on a desktop display screen then on a phone display screen.

Of course, a wide variety of other types of metadata, or different types of metadata, can be used for each modality as well.

Once transformation component 118 has received the metadata corresponding to a given component and environmental characteristics 132, transformation component 118 can optionally access transformation templates 122 in transformation data store 120. This is indicated by block 230 in FIG. 2. In one embodiment, templates 122 correspond to the different modalities of the different display devices. The templates 122 can be supplied to transformation component 118 to provide some initial information on how application metadata 114 can be prioritized or transformed. Templates 122 can be defined for each device category (or modality), or they can be specific to a given environmental characteristic. In cases where template 122 does not provide specific instructions for a given environmental characteristic, the template can be used to generate an initial layout and the layout can then be optimized based on the other environmental characteristics 132, given the particular modality metadata corresponding to the given display component.

By way of example, assume that a phone layout template 128 is provided for laying out a component on a phone where the phone can have either 800 p×480 p or 600 p×480 p resolution. In that case, template 128 may provide a layout based on the priority for the various display components to be used on the user interface display, but the specific resolution 138 can be used (from environmental characteristics 132) to determine the final size of each of those display components.

In one embodiment, templates 122 include three general types of templates, such as a desktop template 124 that defines metadata for larger monitors, higher resolutions and keyboard or mouse input methods. The templates also illustratively include a tablet template 126 which provides metadata for smaller size screens with medium resolution and that have touch based input methods, and a phone template 128 that provides metadata for very small size screens with low resolution and touch based input methods. These general templates, along with specific environmental characteristics 132, can be used to generate the final user experience which is sent to the display device 112. Of course, other types of templates can be used as well, and these are given by way of example only.

In any case, once transformation component 118 has received metadata 114, environmental characteristics 132 and optional transformation templates 122, it performs a transform on the metadata to obtain the user interface display (or user experience) that is to be rendered on the given display device 112. This is indicated by block 232 in FIG. 2. Layout transformation system 108 then transfers the user experience (or user interface display) using user interface component 110, to display device 112. This is indicated by block 234 in FIG. 2. The user interface display is then rendered for view and interaction by user 150. This is indicated by block 236 in FIG. 2.

It will be noted that, at any point, user 150 can take actions to change the environmental characteristics 132 used by layout transformation system 108 to generate the user interface display. By way of example, the user may reorient the display device from a landscape orientation to a portrait orientation, user 150 may plug the device into a docking station, may plug in a different input modality (such as a mouse or keyboard), or provide any other types of interactions that change the environmental characteristics 132. Transformation component 118 determines whether this has taken place, at block 238 in FIG. 4. If not, then the display remains. However, if the user has made changes to environmental characteristics 132, then processing reverts to block 200 where transformation component 118 performs a new transform, based on the new environmental characteristics 113, and generates a new user interface display (or user experience) which is provided to the appropriate display device 112 for display as user interface display 152.

Figure 4:
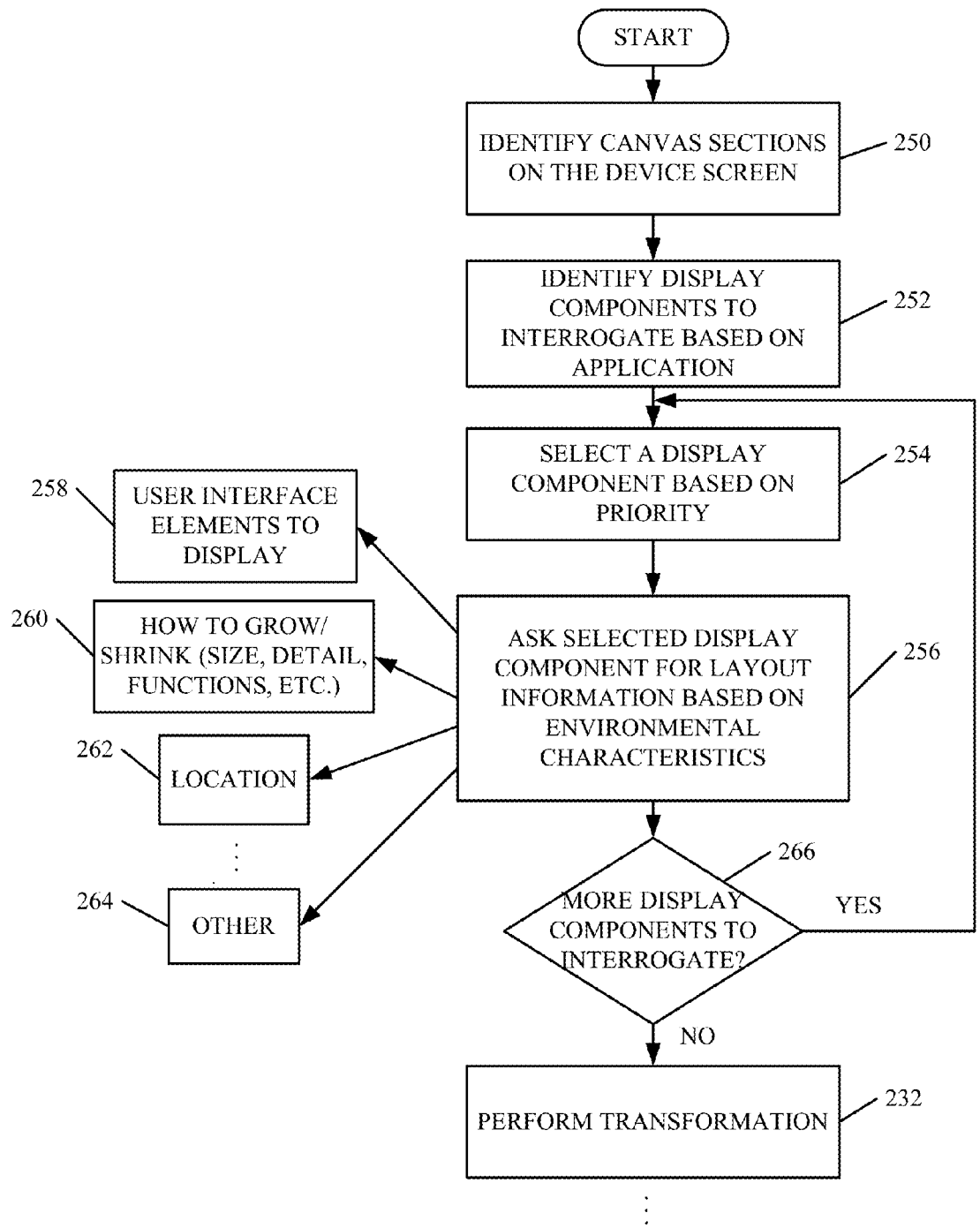
FIG. 4 is a flow diagram illustrating one embodiment of the operation of the system shown in FIG. 1 in interrogating components for layout information.

FIG. 4 shows a flow diagram illustrating one embodiment of the operation of transformation component 118 in interrogating a display component (such as display component 208) to generate the desired user interface display. Transformation component 118 first identifies the canvas sections on the display screen. As mentioned above, each canvas section is a portion of the display screen that can be used to display one or more display components. Therefore, from the environmental characteristics 132, or otherwise, transformation component 118 identifies the number and location of the various canvas sections on the display screen being used. This is indicated by block 250 in FIG. 3.

Transformation component 118 then identifies the particular components to interrogate based on application 104. For instance, if the user has requested application 104 to display a customer entity that represents a customer in the business application, application 104 will provide an indication to transformation component 118 of the various display components that are to be displayed based on that request. As discussed with respect to the example above, the customer entity may include a list of contacts of the customer, a chart of orders for the customer, an image corresponding to the customer, or other lists, charts, grids, or other display components. Identifying the display components is indicated by block 252 in FIG. 4.

Transformation component 118 then selects one of the display components based on the component priority. This is indicated by block 254. Transformation component 118 then interrogates the selected display component for layout information based upon the environmental characteristics 132 that have been received. This is indicated by block 256.

By way of example, transformation component 118 may display interrogate component 208 to determine what type of user interface elements need to be displayed (such as a bar chart, a pie chart, etc.). This is indicated by block 258. Transformation component 118 can also interrogate display component 208 to determine how to grow or shrink the user interface display based upon the modality where the user interface display is going to be displayed.

For instance, if the user is switching from a smart phone to a desktop computer, it may be that the user does not simply wish the display from the smart phone display to be enlarged to fit the size of the desktop screen. Instead, it may be that the user wishes to have more detail displayed, instead of simply larger information. By accessing the different types of modality metadata 212-220 (shown in FIG. 3), transformation component 118 can determine how to grow or shrink the user interface display that display component 208. This is indicated by block 260 in FIG. 4. Transformation component 118 then identifies the particular location on the display screen where the display component is to be displayed. That is, transformation component 118 illustratively identifies the canvas section that is to hold the display of this particular display component. This is indicated by block 262 in FIG. 4. Transformation component 118 can, of course, interrogate the display component for other information as well, and this is indicated by block 264 in FIG. 4.

Transformation component 118 then determines whether there are additional display components to interrogate in generating the user interface display. This is indicated by block 266 in FIG. 4. If so, processing reverts back to block 254. If not, however, transformation component 118 proceeds to perform the transformation in order to generate the user interface display. This is indicated by block 232 in FIG. 4.

Figure 5A:
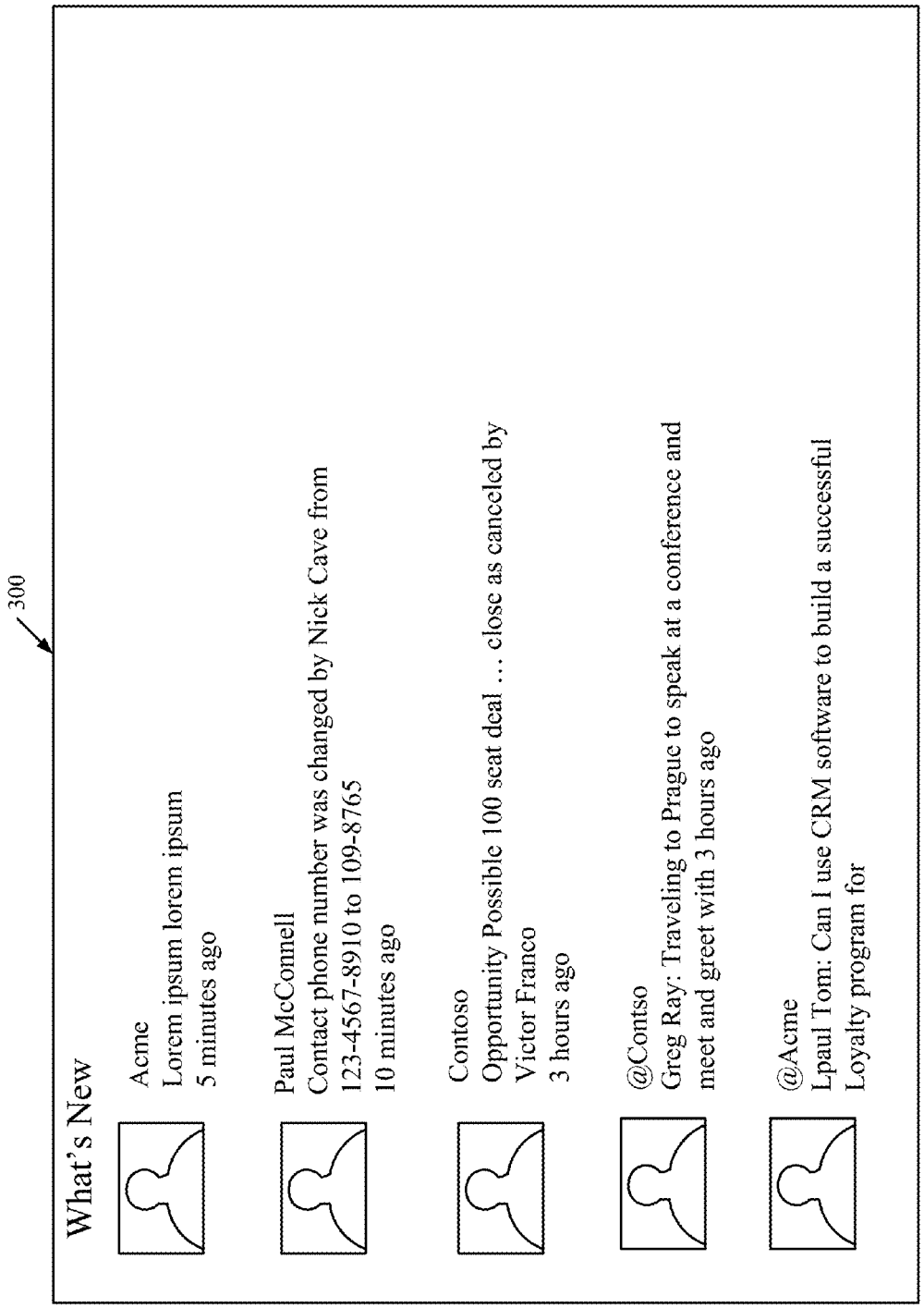
FIGS. 5A-5G show a set of exemplary user interface displays.

FIGS. 5A-5G illustrate how transformation component 118 can illustratively transform a user interface display given various metadata and environmental characteristics. FIGS. 5A-5G show a relatively simple layout complexity in that each display screen has only one or two canvas sections. For instance, FIG. 5A shows the display of a list component that lists announcements under the heading "what's new". It can be seen that the single display component (the list) takes up the entire display screen so that there is only one canvas on the display screen.

Figure 5B:
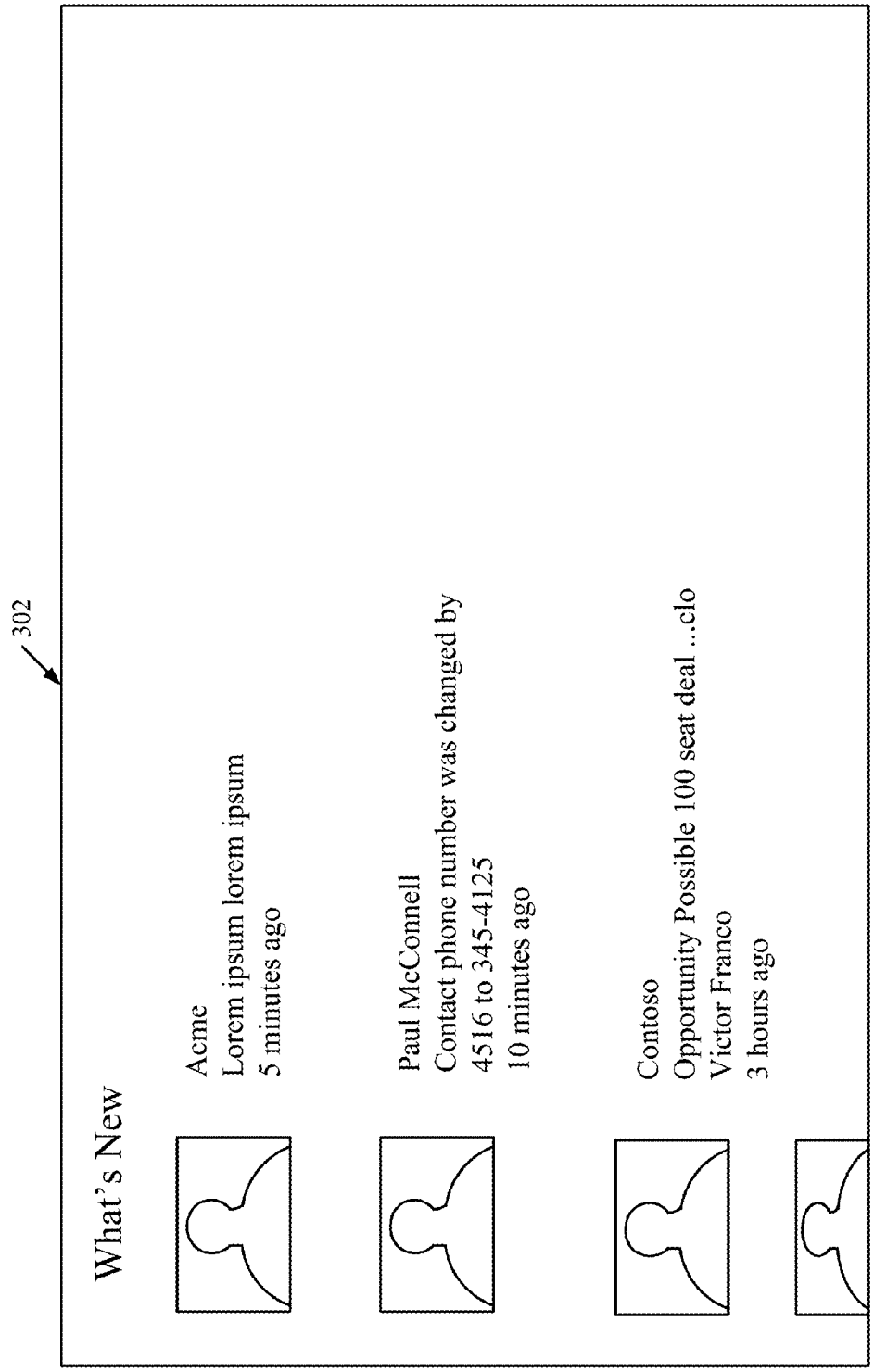

FIG. 5B shows a similar user interface display 302, except that it has been transformed by transformation component 118 for a tablet computer in the landscape orientation. It can be seen that, instead of simply shrinking the display 300 of FIG. 5A to fit the screen size shown in FIG. 5B, the list component on display 302 simply displays less information, but the text is the same size as in display 300.

Figure 5C:
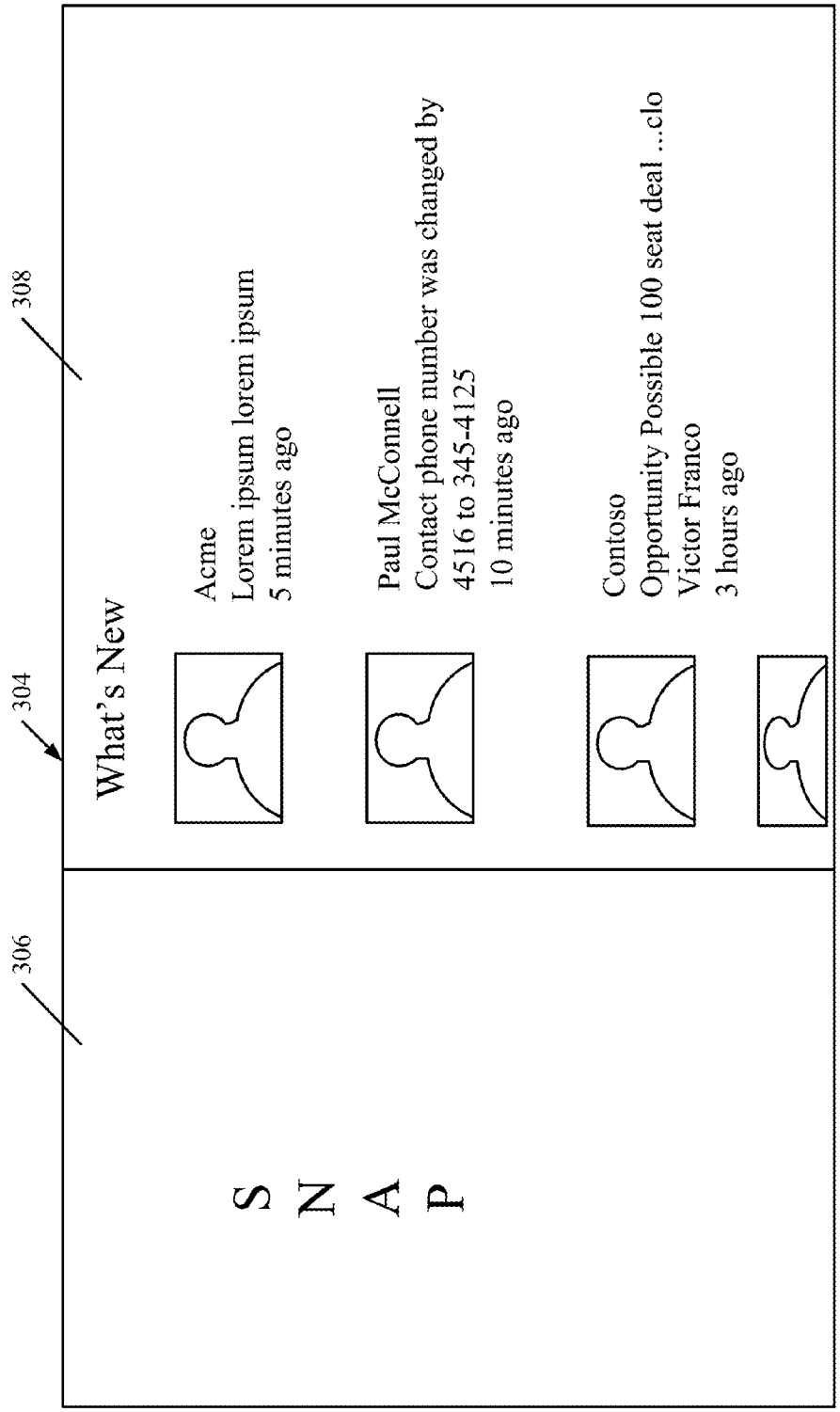
Figure 5D:
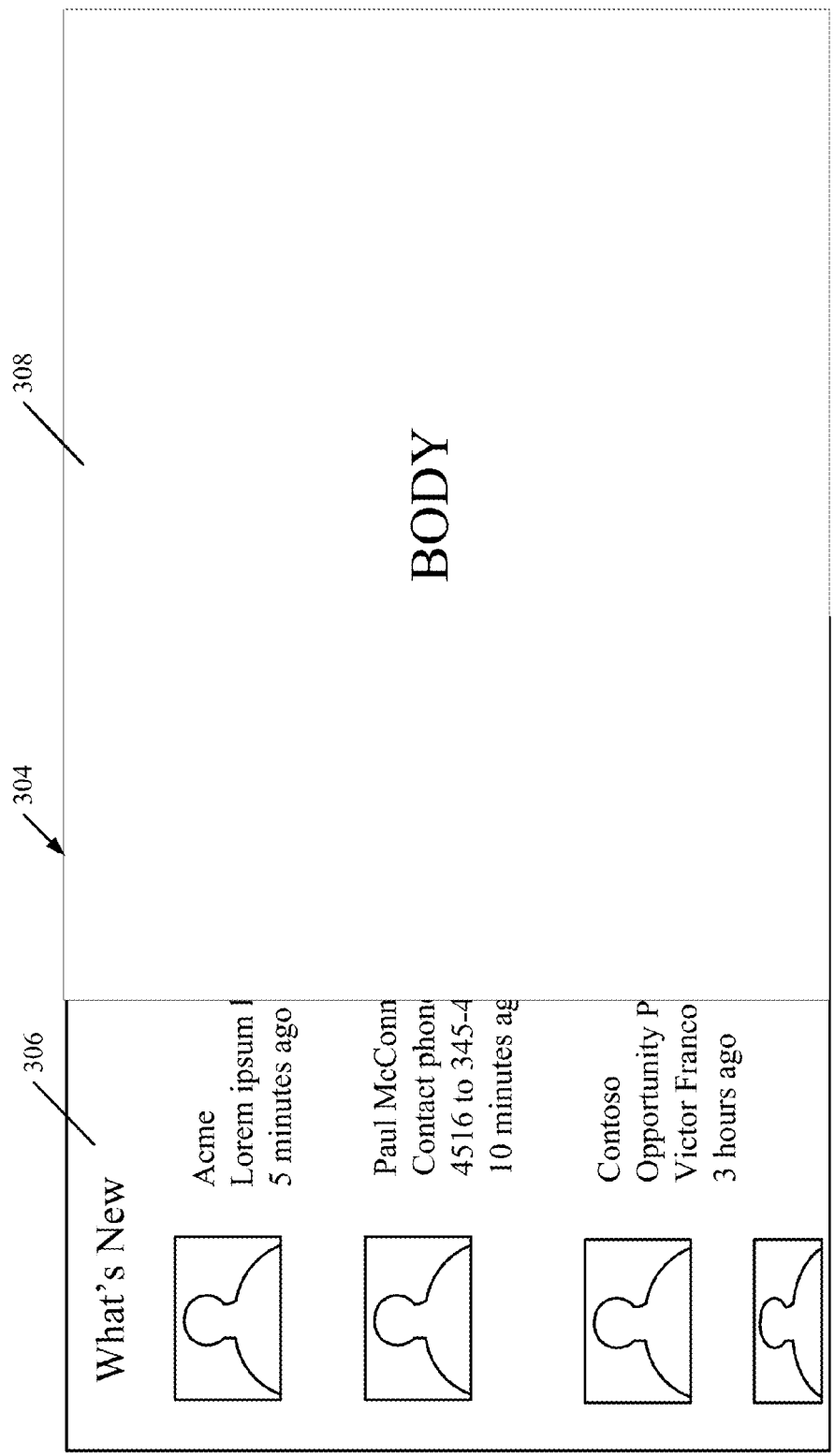

FIG. 5C shows a user interface display 304 where the tablet display screen now has two canvas sections, a "snap" section 306 on the left and a "body" section 308 on the right. It can be seen that the "snap" section 306 has been left blank while the "body" section 308 displays the list component shown in FIGS. 5A and 5B. In the embodiment shown in FIG. 5C, the particular component metadata identifies that, for a tablet computer display screen 308 where snap and body sections are provided, the list component is to be displayed in the body section 308 as shown. FIG. 5D shows the same display, except that the list component is now displayed in the "snap" section 306. Transformation component 118 has transformed the display so that it is presented as shown. Of course, it can be transformed in many different ways, that are not shown, such as having the lines of text in each list item wrap differently than shown in the previous figures, by way of example, or other ways.

Figure 5E:
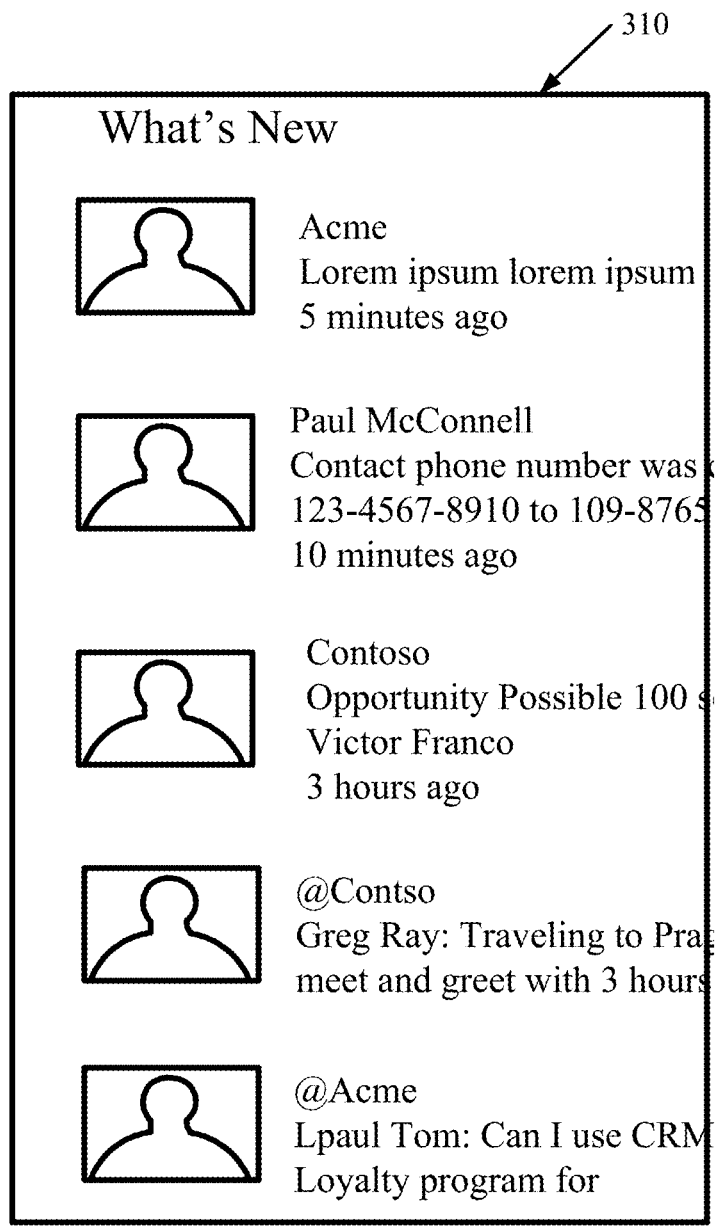

FIG. 5E shows the list component displayed on a tablet computer display 310 in the portrait orientation. For example, transformation component 118 may have detected that the user has rotated the orientation of the tablet computer from the landscape orientation shown in FIG. 5B to the portrait orientation shown in FIG. 5E. Again, the textual lines in the list component wrap differently, and more list entries are shown than are shown in the landscape orientation.

Figure 5F:
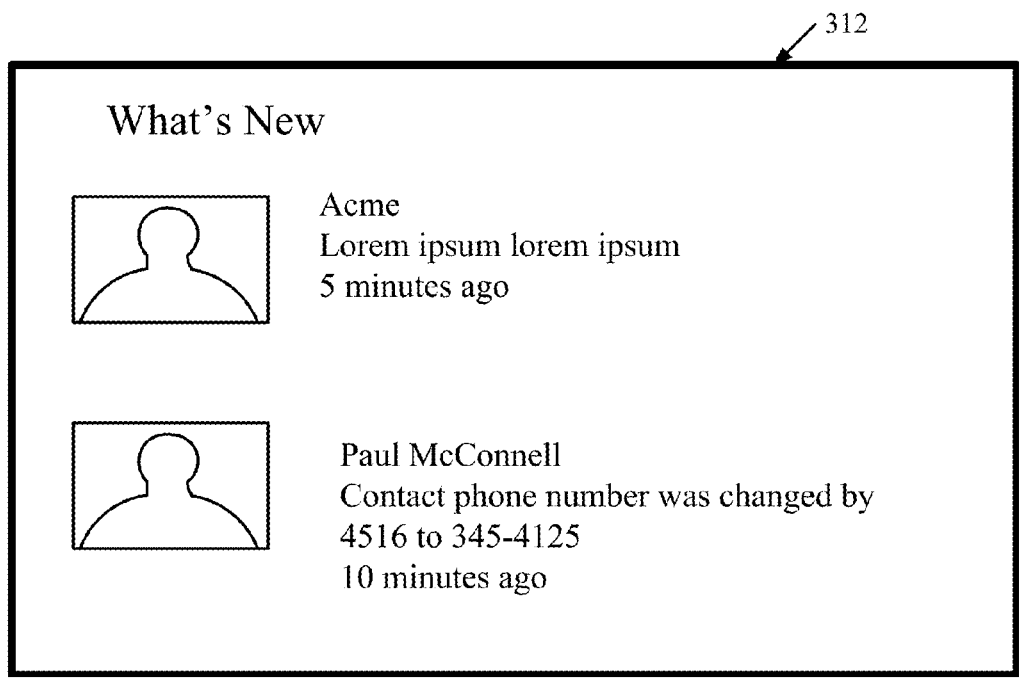
Figure 5G:
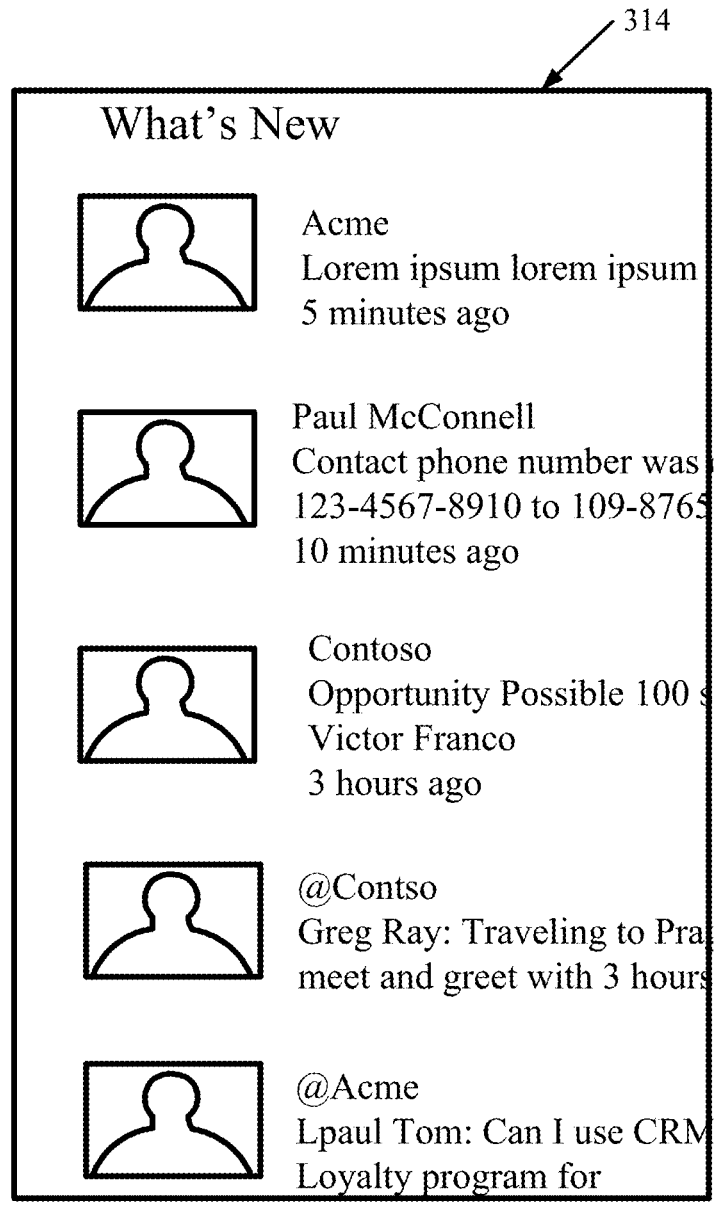

FIGS. 5F and 5G show the user interface display for the same list components shown in FIGS. 5A-5E, but generated for a smart phone display in the landscape and portrait orientations, respectively. Again, it can be seen that the display screens have only one canvas section and the component is displayed such that it consumes the entire canvas section. In FIG. 5F, the smart phone shows the list component 312 in the landscape orientation. In FIG. 5G, the list component display 314 is revised to that shown, which is different than in FIG. 5F, because display 314 is in the portrait orientation. In another embodiment, the information can be displayed without truncating information to the right of the display edge, because transformation component 118 can determine (based on the environmental characteristics) that the smart phone is in the portrait display orientation rather than the landscape orientation. Other embodiments can be used as well.

Figure 6A:
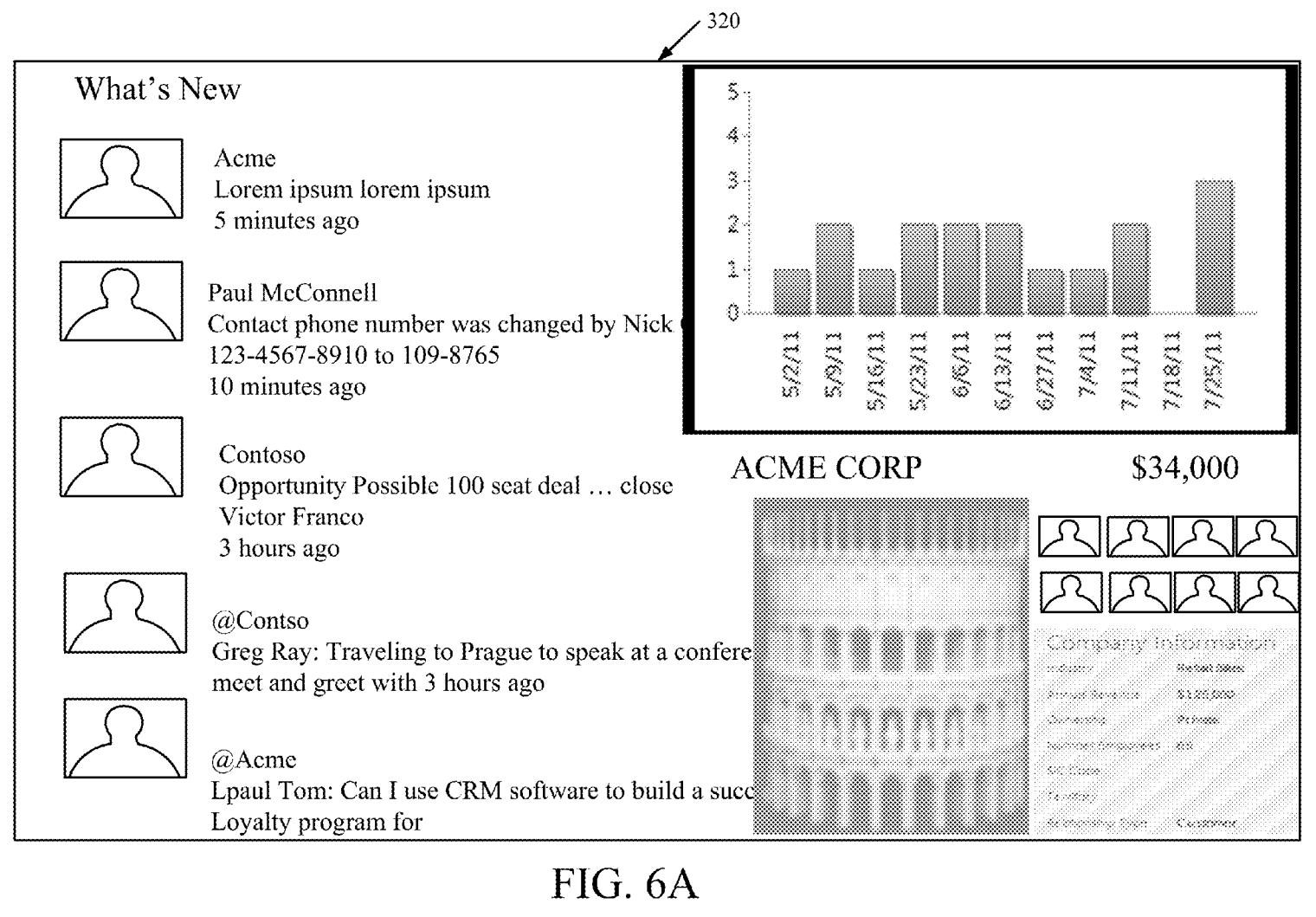

FIG. 6A-6M show exemplary user interface displays in a more complex display layout than that shown in FIGS. 5A-5G. For instance, it can be seen that user interface display 320 on a desktop shown in FIG. 6A has four canvas sections. The first is a section that consumes the left half of the screen. The second is a section that consumes the upper right quadrant of the screen, and the third and fourth sections consume the lower right quadrant of the screen. Different components are displayed in different canvas sections. The first canvas section displays the same list component as shown in FIG. 5A, while the second canvas section displays a bar chart, the third canvas section displays an image in an account display component and the fourth canvas section displays a list of users and company information in the account display component. Thus, the account display component is displayed across two canvas sections. In order to generate this display, transformation component 118 illustratively identified the various different display components that needed to be displayed from application 104 and also determined their priority and assigned their display location to a given canvas section based on the priority. Transformation component 118 illustratively used the environmental characteristics to determine how much information for each component could be displayed in each given canvas section.

FIG. 6B shows a similar user interface display 322, except that it is generated for a tablet computer in the landscape orientation. It can be seen that the "What's new" list component shows less information, and it has not simply shrunk the information down in size. Rather, the text and images are the same size, but there is simply less information displayed. The chart, on the other hand, is displayed with the same amount of information The account component has also rearranged itself so that it can fit around the image, into the smaller space. Transformation component 118 rearranges this component based upon the environmental characteristics and the metadata corresponding to the account component.

Figure 6C:
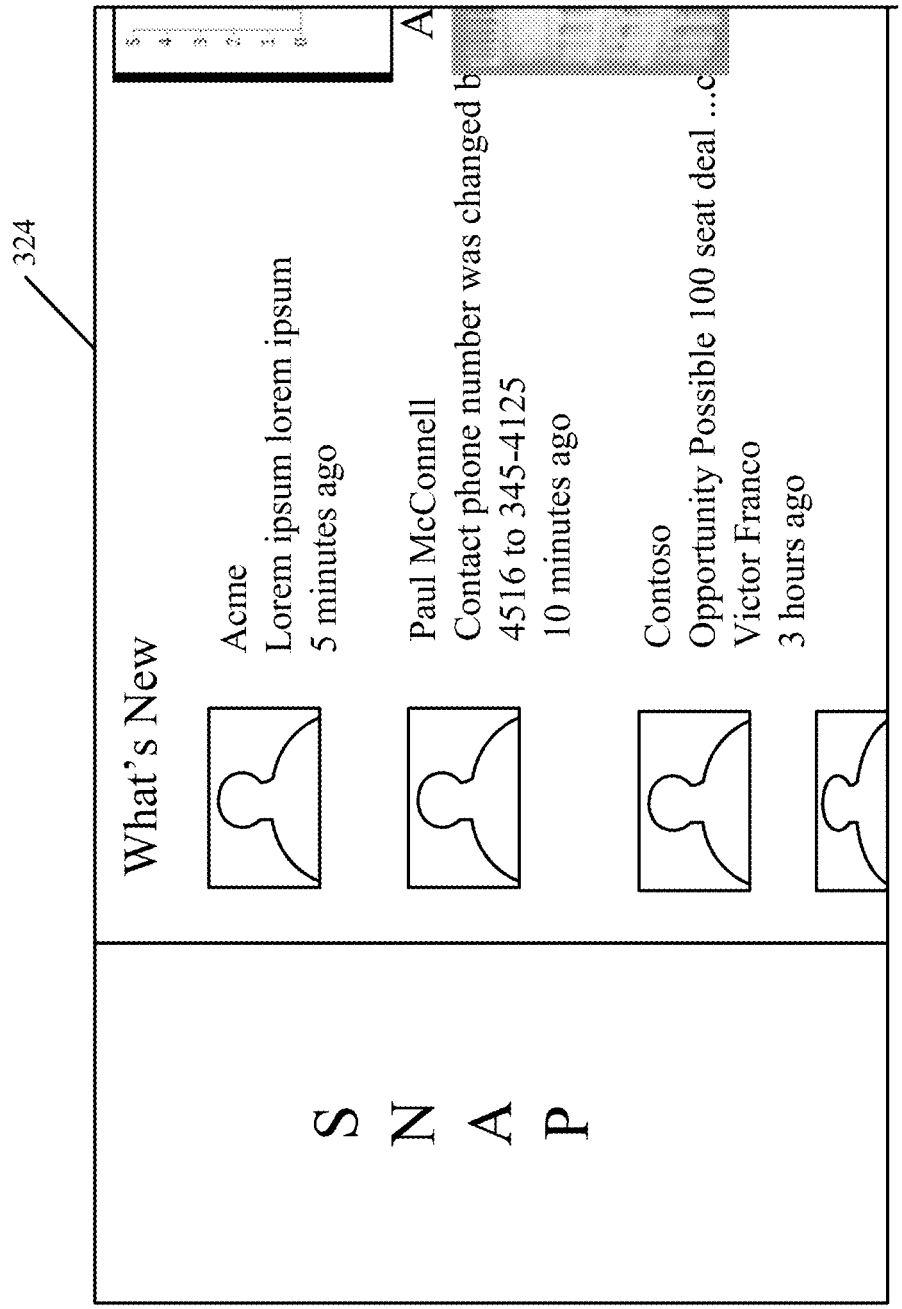
Figure 6D:
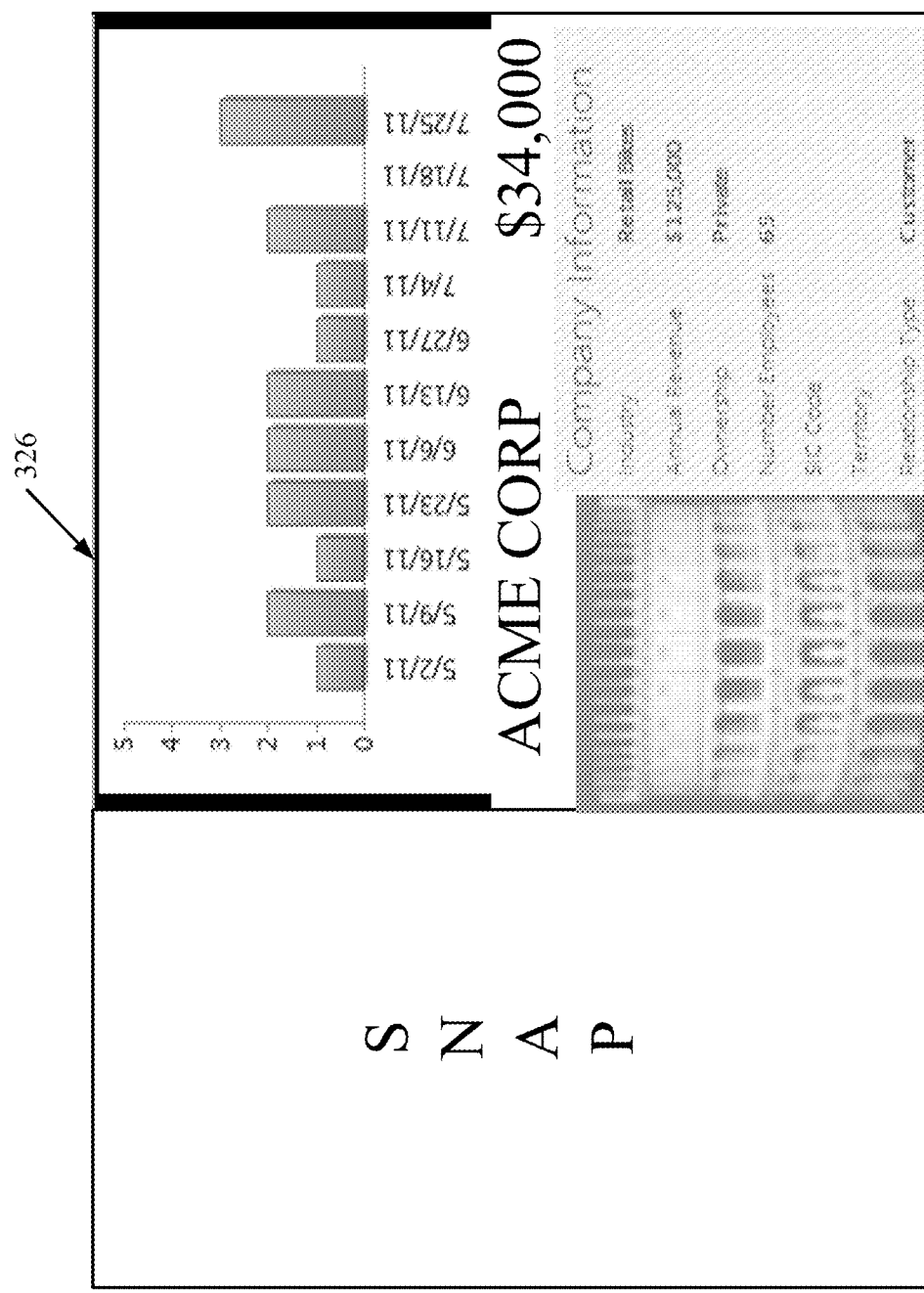

FIGS. 6C and 6D show how the user interface display of FIG. 6B is rendered on a tablet computer, in the landscape orientation, where the information is to be shown in the "body" canvas section. FIG. 6C shows the initial user interface display 324, and FIG. 6D shows the user interface display 326 when the user has swiped his or her finger to the left on the display screen. This causes the display to move from that shown in FIG. 6C to that shown in FIG. 6D.

Figure 6E:
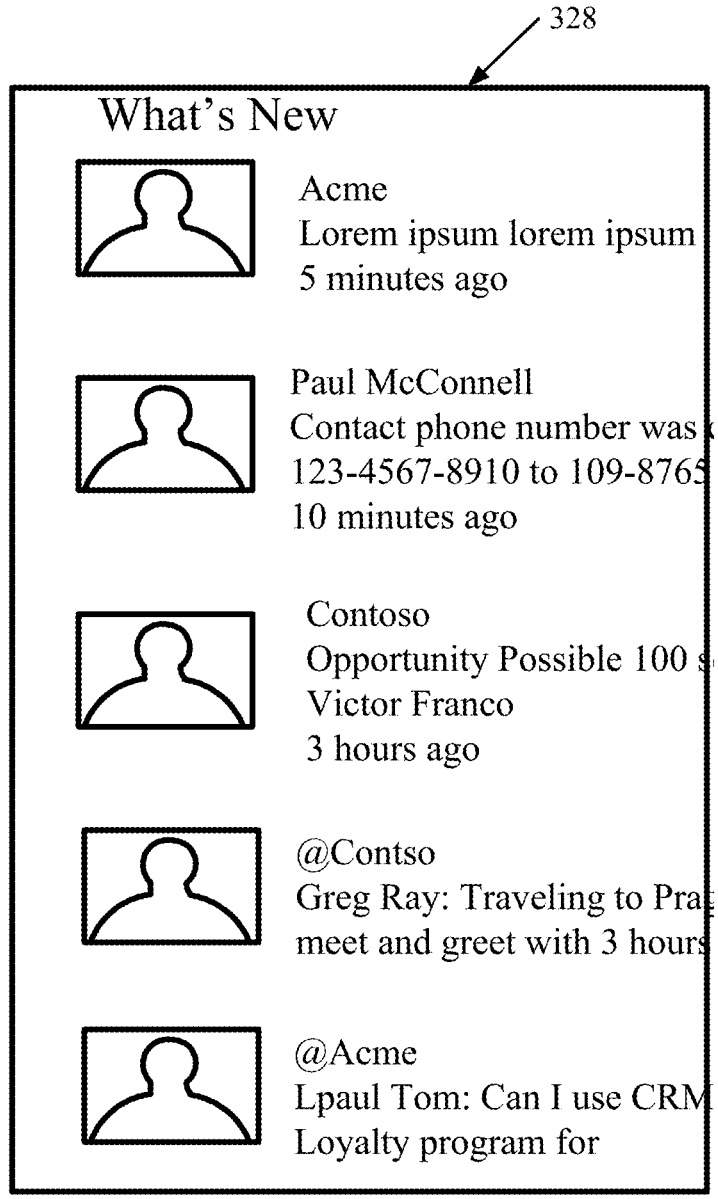
Figure 6F:
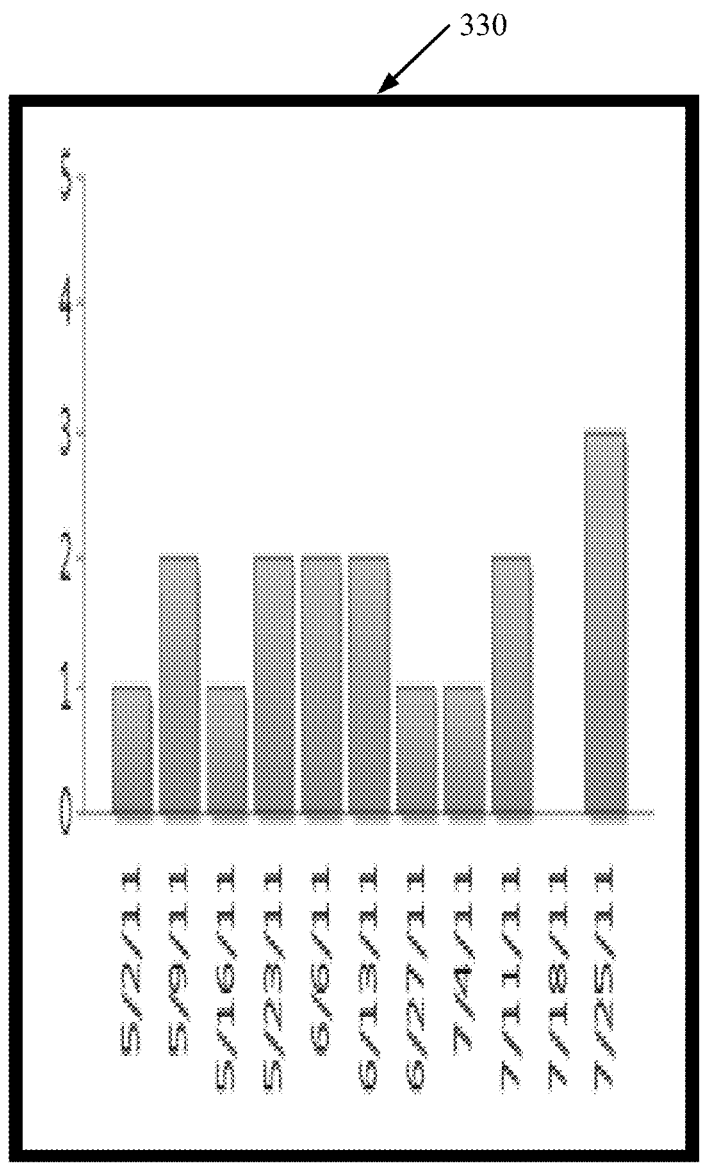
Figure 6G:
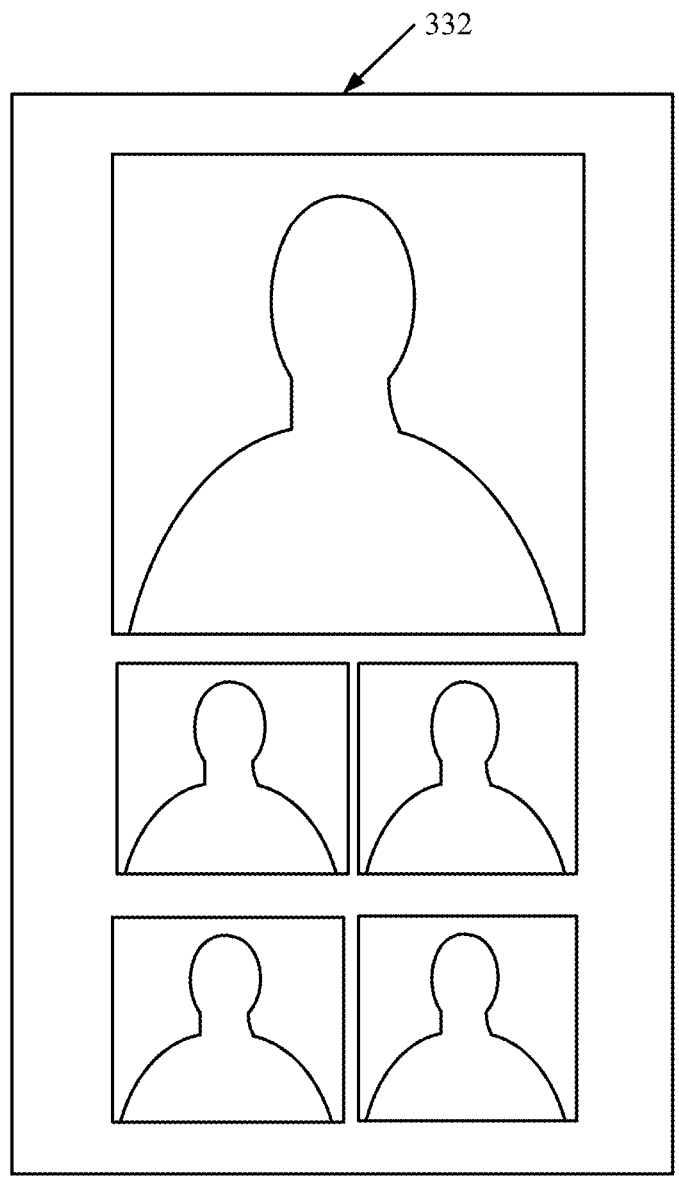

FIGS. 6E, 6F and 6G show the user interface display of FIG. 6B, for a tablet computer in the portrait orientation. It can be seen that the portrait orientation includes only a single canvas section so that one component is displayed on the entire screen, at a time. FIG. 6E shows the initial display 328 which shows the list component (which has the highest priority). When the user swipes to the left on the display screen, the display 330 of FIG. 6F is shown where the bar chart component is displayed. This is because the bar chart has the second highest priority after the list component. FIG. 6G shows the display 332 of the account component. This is displayed when the user again swipes to the left on the user interface display screen. This is because the account component has the third highest priority.

Figure 6H:
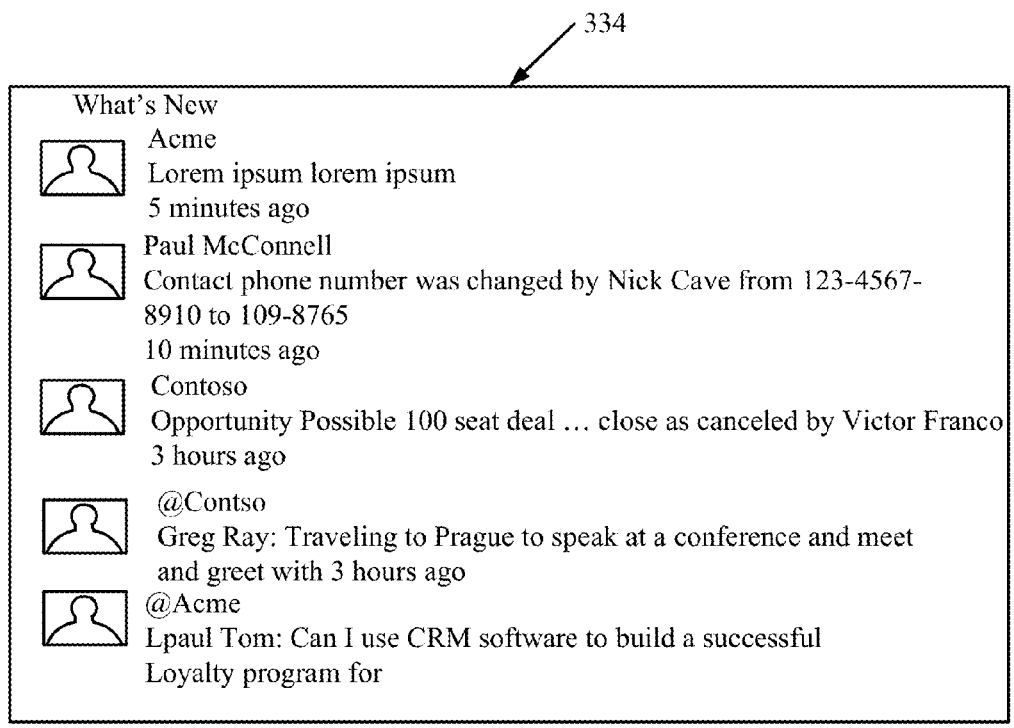
Figure 6I:
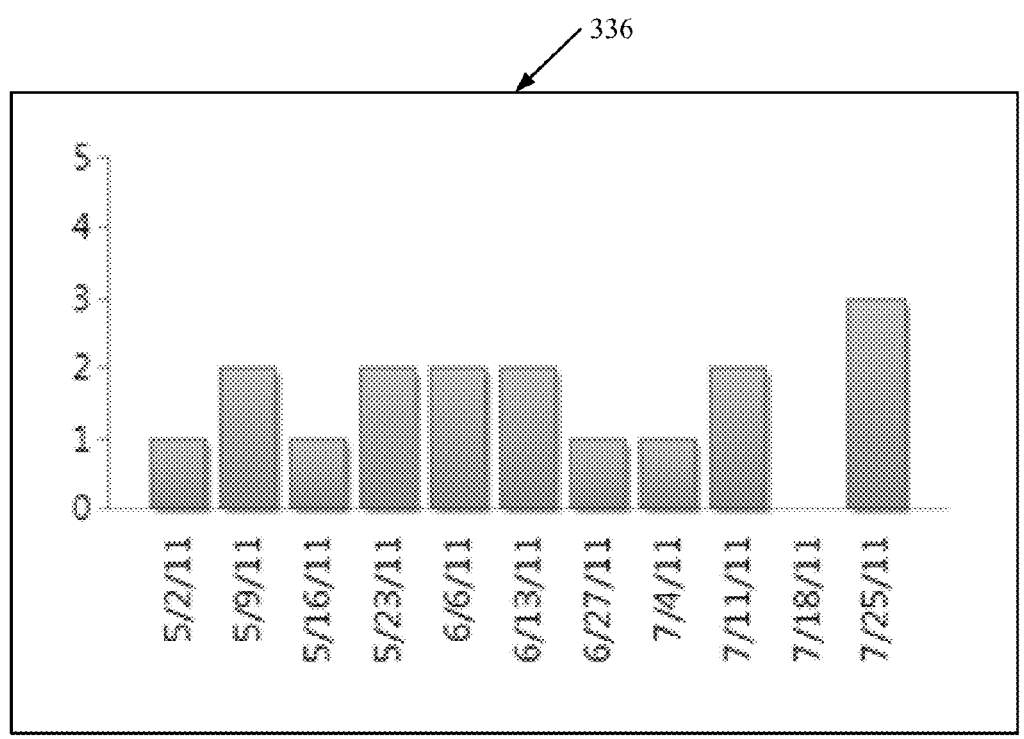
Figure 6J:
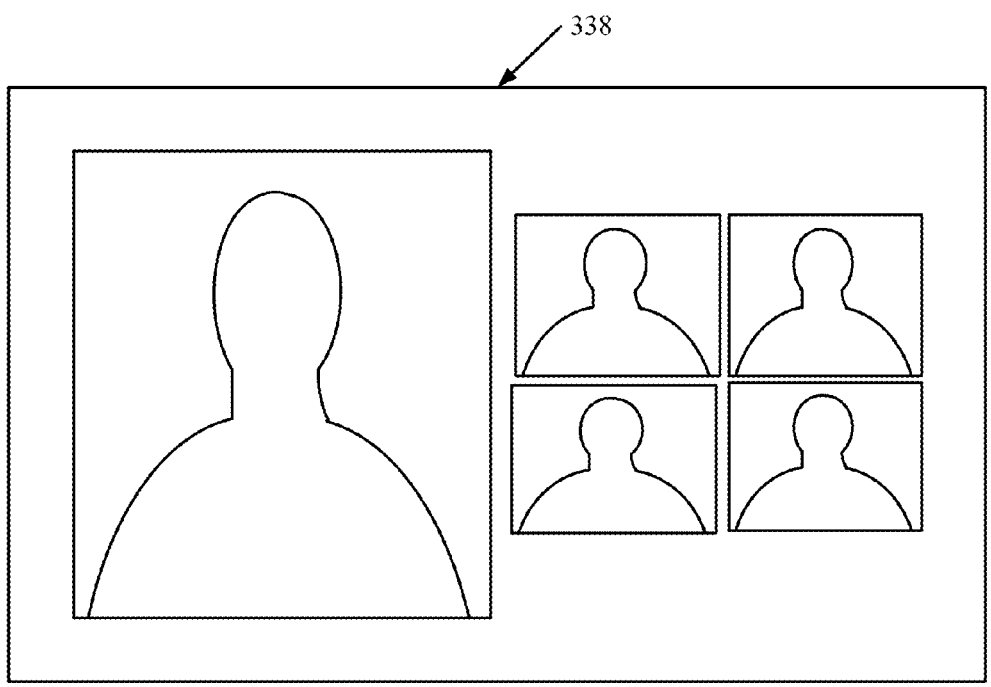

FIGS. 6H, 6I and 6J show the user interface display generated for a mobile device (such as smart phone) in the landscape orientation. Again, as with FIGS. 6E-6G, the list is displayed in the first display 334 of FIG. 6H because it has the highest priority. When the user swipes to left once or twice, the bar chart component or the account component are displayed, respectively, based on their respective priorities, in displays 336 and 338.

Figures 6K, 6L, 6M:
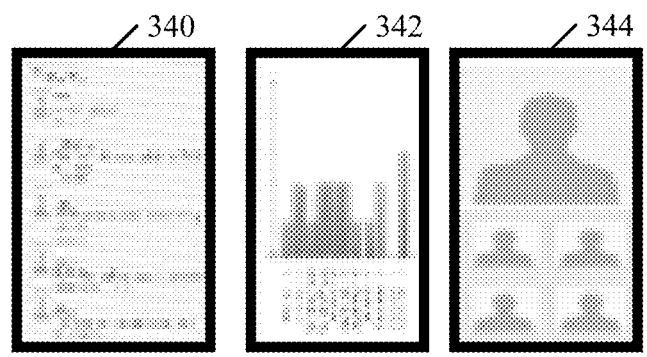

FIGS. 6K, 6L and 6M show the same displays as FIGS. 6H-6J, except that they are rendered on a mobile device (such as a smart phone) in the portrait orientation. Again, the displays change from display 340 shown in FIG. 6K to display 342 shown in FIG. 6L to display 344 shown in FIG. 6M, as the user swipes his or her finger on the user interface display. The user interface display changes from the highest priority display 340 displaying the highest priority display component to the lowest priority display 344 displaying the lowest priority display component, and vice versa, as the user changes the direction of the swipe.

It can thus be seen that layout transformation system 108 takes application metadata and destination environmental characteristics and performs the transform on the metadata to tailor the display to the specific environment where it will be displayed. The system can be provided with optional transformation templates 122 which provide preprocessed layout information for various modalities. Templates can be predefined and provide information as to how the application metadata should be prioritized as it is transformed between devices. The system can also dynamically determine the layout during runtime, as the priority or environmental characteristics change. The system can optimize the user interface display based specifically on the input modalities available, such as whether a touch sensitive input modality or mouse and keyboard systems are available. Further, the system can interrogate the display components that are to be laid out to identify component changes based on environmental characteristics, etc.

Figure 7:
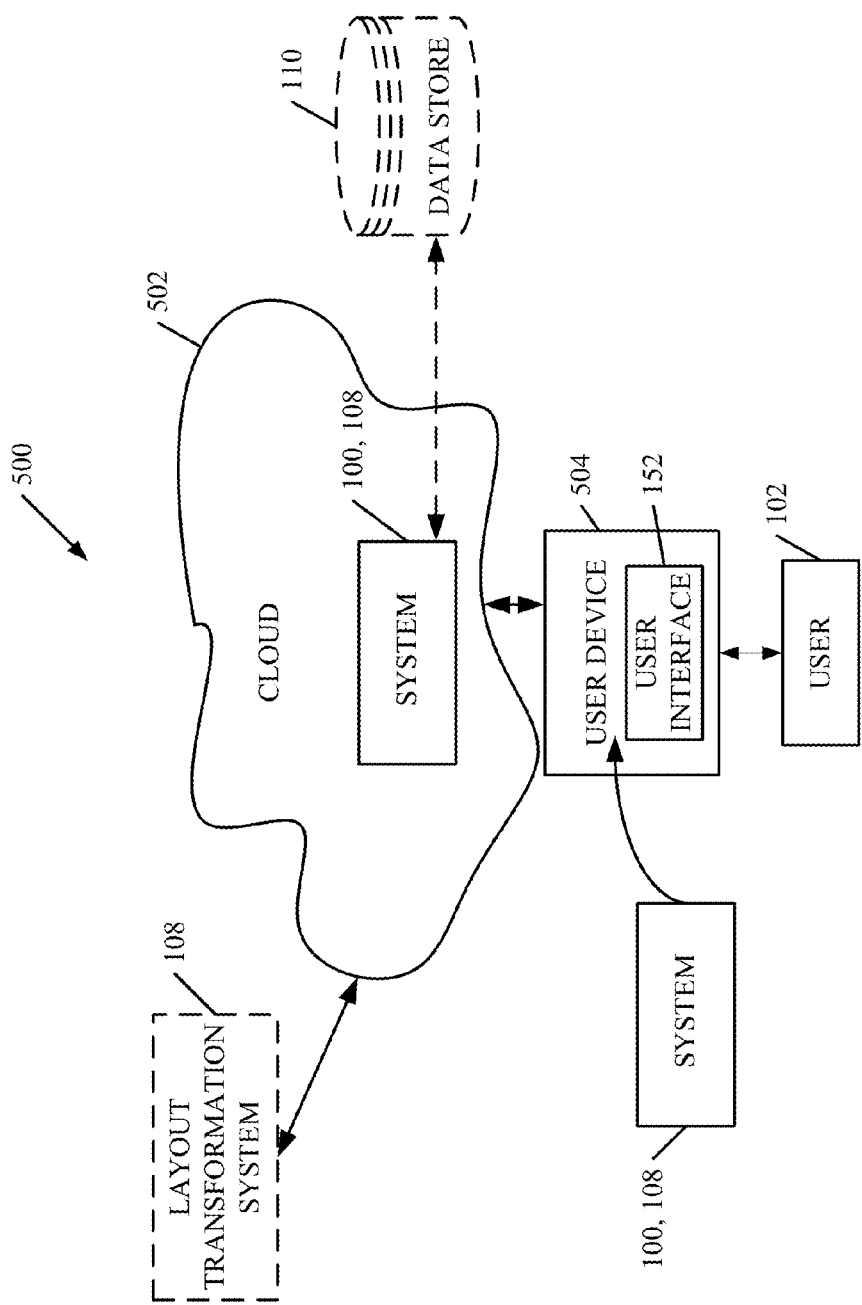
FIG. 7 is a block diagram of various computing architectures.

FIG. 7 is a block diagram of system 100, shown in various architectures, including cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 (or system 108) as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

The embodiment shown in FIG. 7, specifically shows that business system 100 is located in cloud 502 (which can be public, private, or a combination where portions are public while others are private). Therefore, user 150 uses a user device 504 to access those systems through cloud 502.

FIG. 7 also depicts another embodiment of a cloud architecture. FIG. 7 shows that it is also contemplated that some elements of business system 100 (or system 108) are disposed in cloud 502 while others are not. By way of example, data store 106 can be disposed outside of cloud 502, and accessed through cloud 502. In another embodiment, some or all of the components of system 100 (or system 108) are also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. FIG. 7 further shows that some or all of the portions of system 100 (or system 108) can be located on device 504. All of these architectures are contemplated herein.

It will also be noted that system 100 (or system 108), or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
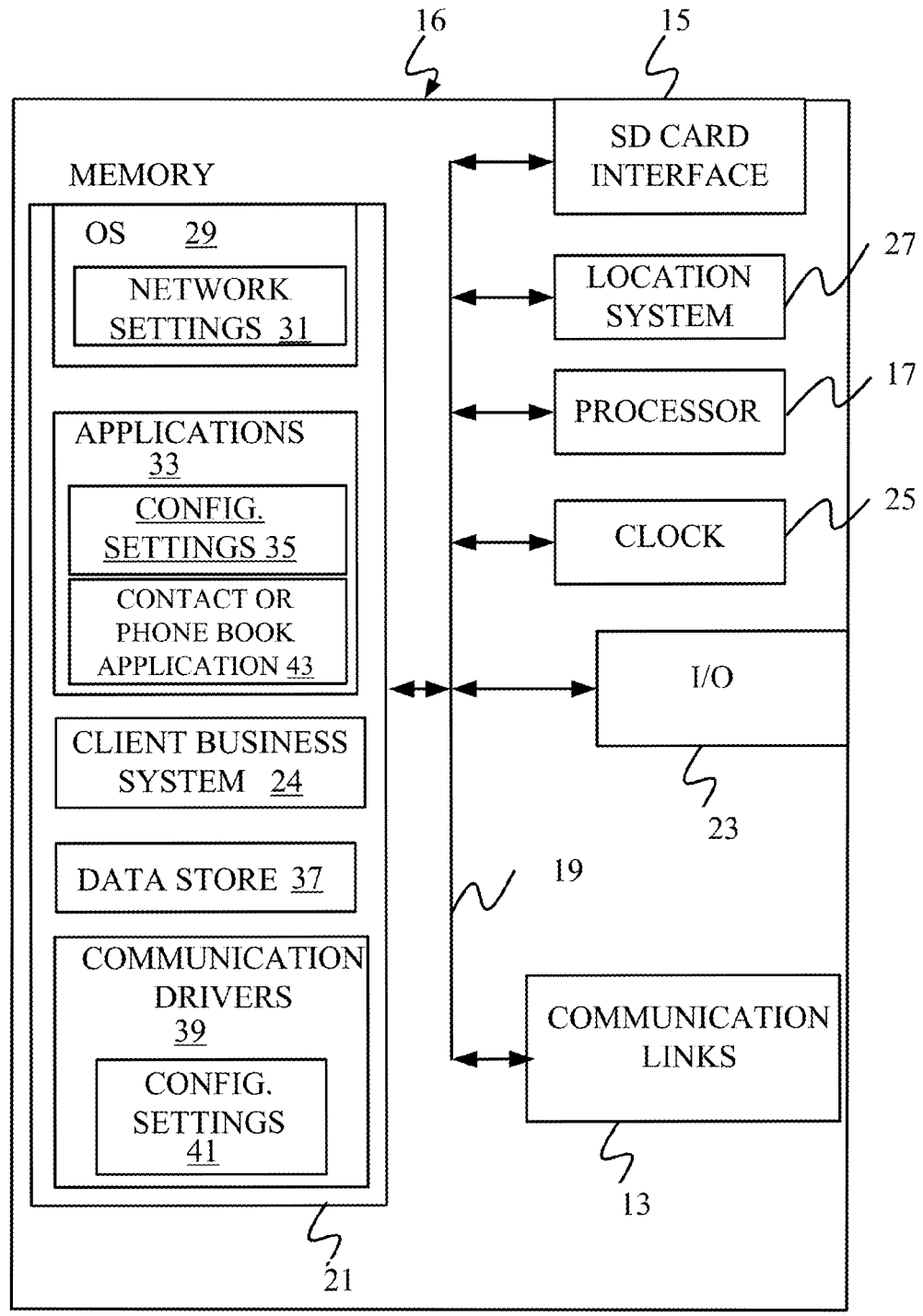
FIGS. 8-11 show illustrative mobile devices.
Figure 9:
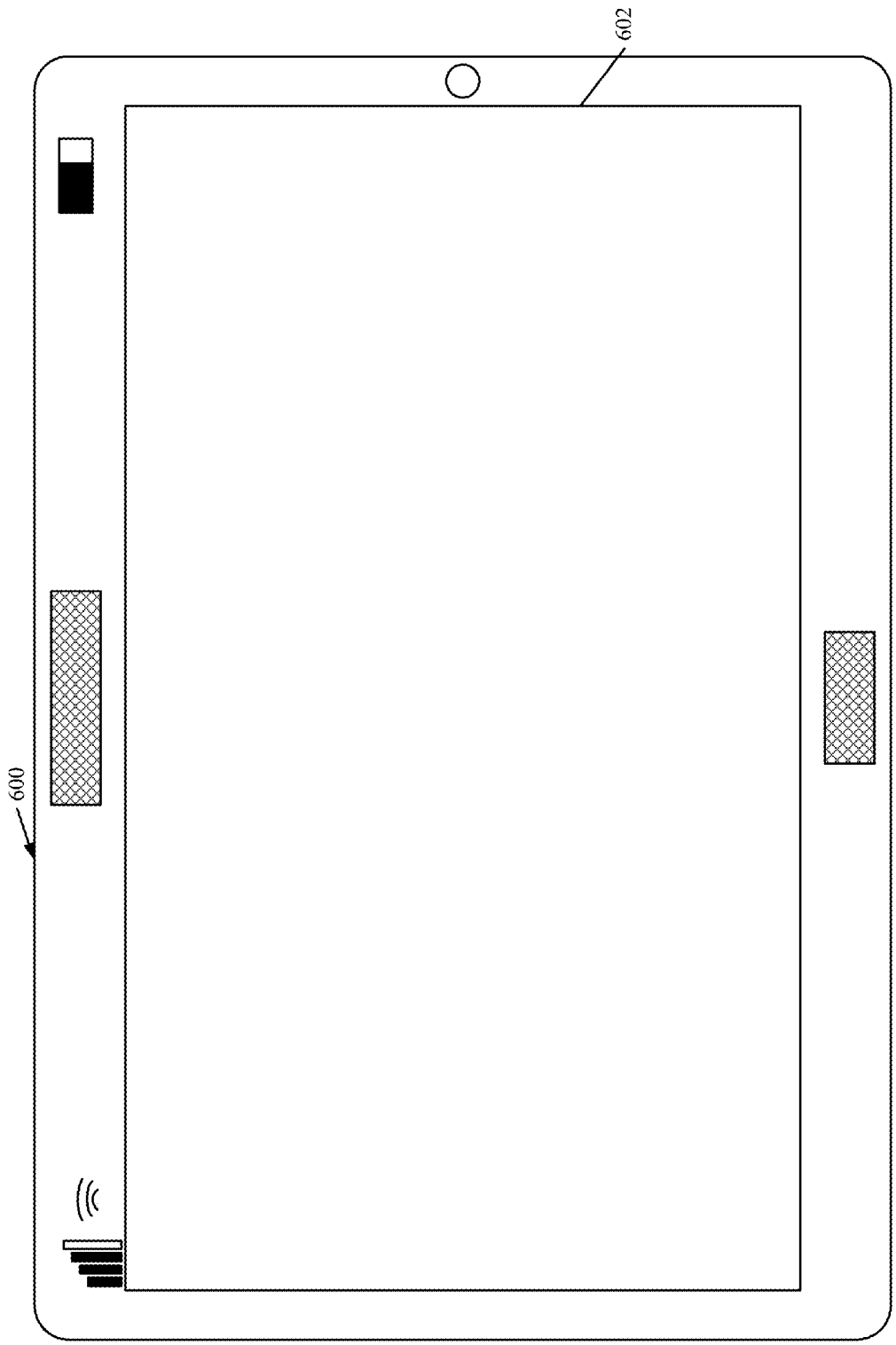
Figure 10:
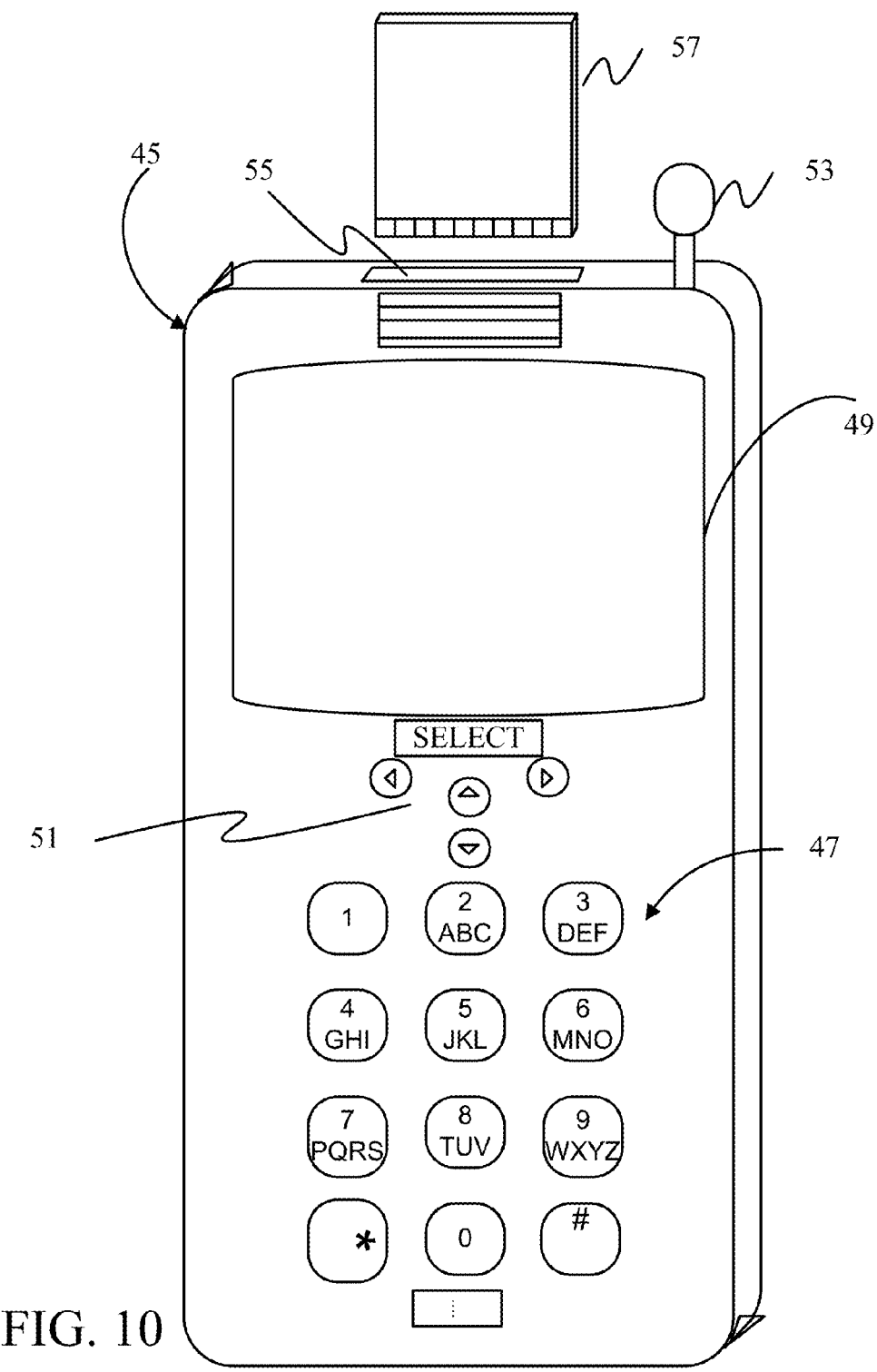
Figure 11:
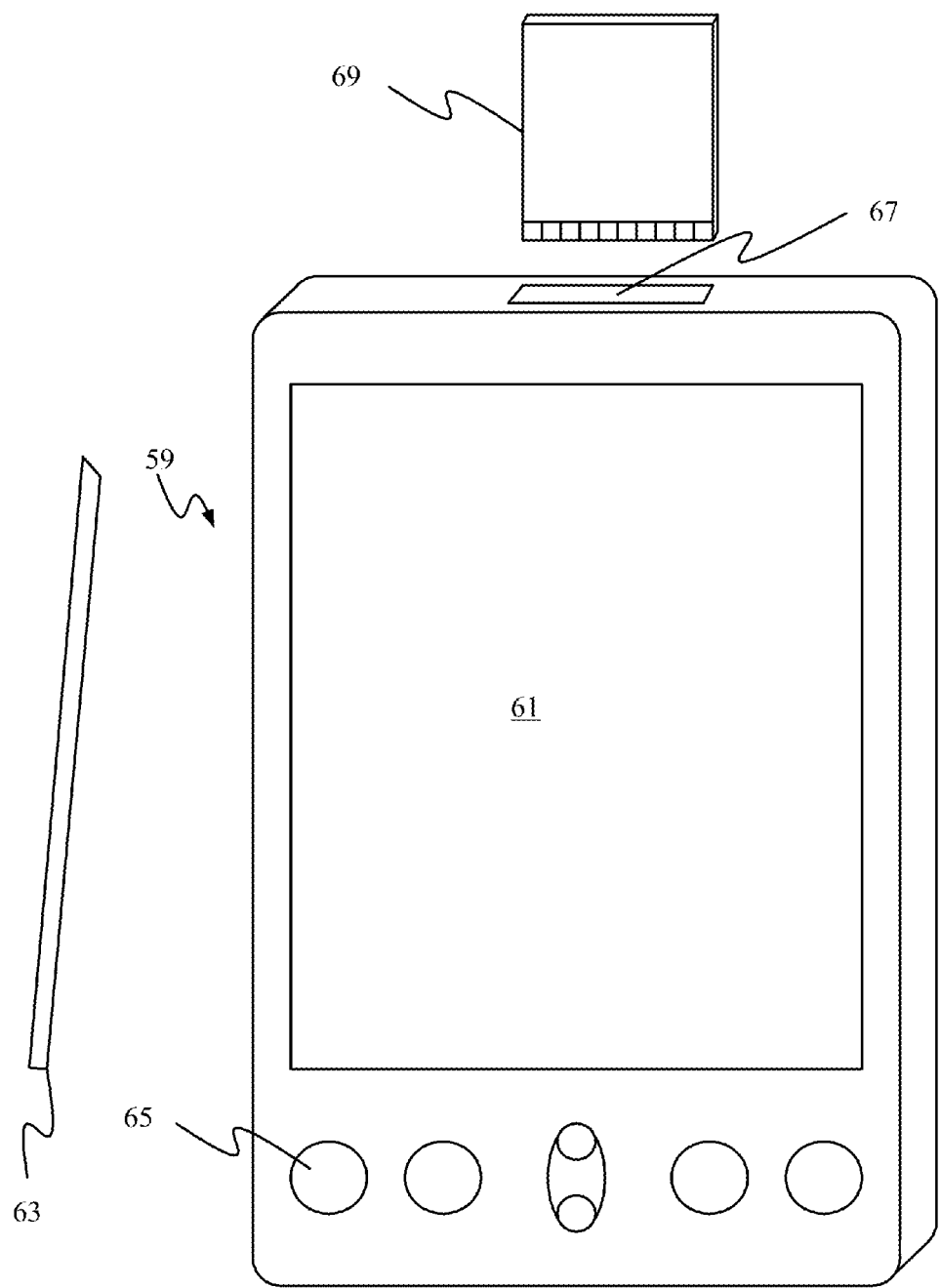

FIG. 8 is a simplified block diagram of one illustrative embodiment of a handheld or mobile computing device that can be used as a user's or client's hand held device 16, in which the present system (or parts of it) can be deployed. FIGS. 9-11 are examples of handheld or mobile devices.

FIG. 8 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100 or system 108) are received on a removable Secure Digital (SD) card that is connected to a SD card interface 15. SD card interface 15 and communication links 13 communicate with a processor 17 (which can also embody processors 102 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, communication configuration settings 41, and contact or phone book application 43. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data store 106, for example, can reside in memory 21. Similarly, device 16 can have a client business system 24 which can run various business applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 9, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIGS. 10 and 11 provide additional examples of devices 16 that can be used, although others can be used as well. In FIG. 10, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 12:
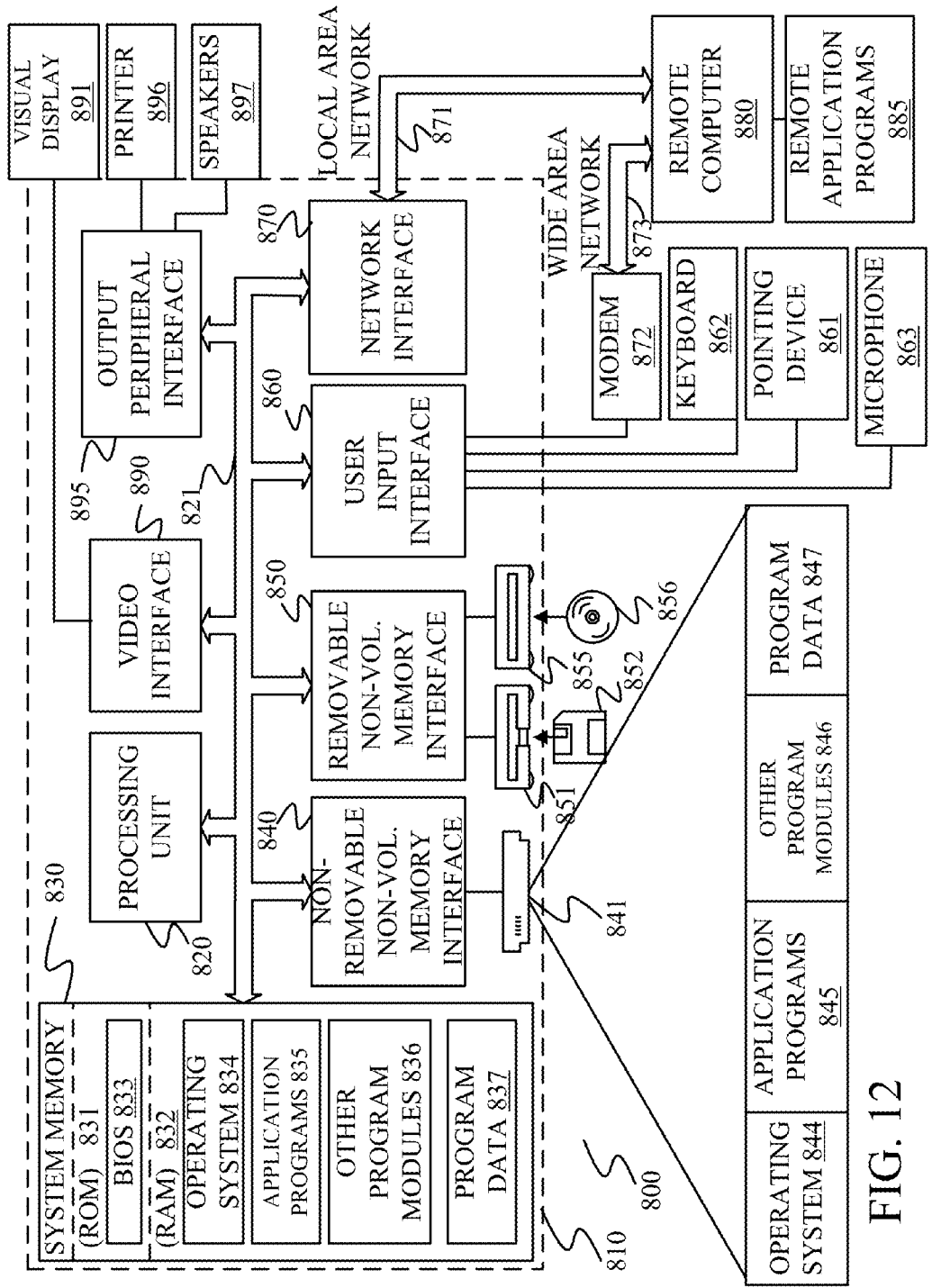
FIG. 12 shows one illustrative computing environment.

FIG. 12 is one embodiment of a computing environment 800 in which system 100 (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 102), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of generating a representation of application data, comprising:
    identifying a plurality of display components for a user interface display;
    receiving an indication of data bindings that bind the application data to the display components;
    receiving an indication of an environmental characteristic, indicative of a particular display modality used to display the application data;
    for each display component in the plurality of display components,
    interrogating the display component for component metadata that includes priority metadata and modality metadata, the priority metadata indicating a priority of the display component relative to other display components, and the modality metadata indicating how to render the display component for the particular display modality;
    identifying a set of canvas sections for rendering the user interface display using the particular display modality, wherein each canvas section has an associated display priority; and
    generating the user interface display for display on a display device, wherein generating comprises:
        for each of the canvas sections, selecting a display component from the plurality of display components based on the display priority of the canvas section and the priority of the selected display component indicated by the priority metadata, wherein the selected display component displays the application data bound to the selected display component based on the modality metadata of the selected display component.

2. The computer-implemented method of claim 1 wherein generating the user interface display comprises:
    selecting a first display component having a highest priority for display in a first canvas section having a highest display priority.

3. The computer-implemented method of claim 1, further comprising:
    selecting a first transformation template from a plurality of different transformation templates that correspond to a plurality of different display modalities, each transformation template of the plurality of different transformation templates including rendering instructions for rendering display components using a given one of the different display modalities.

4. The computer-implemented method of claim 3 wherein the plurality of different transformation templates are distinct from the priority and modality metadata for the display components, and wherein the plurality of different transformation templates comprise:
    a desktop transformation template that has instructions for rendering a display component using a desktop display modality,
    a tablet transformation template that has instructions for rendering a display component using a tablet display modality, and
    a telephone transformation template that has instructions for displaying a display component using a telephone display modality.

5. The computer-implemented method of claim 1 wherein identifying a plurality of display components comprises:
    receiving an indication of a user input to display the application data; and
    receiving the set of display components from an application.

6. The computer-implemented method of claim 1, wherein the modality metadata for each display component is indicative of rendering instructions for rendering the display component on a plurality of different modalities.

7. The computer-implemented method of claim 1, wherein generating the user interface display comprises:
    generating a layout for the display components based on the priority metadata and generating a display of each of the display components based on the modality metadata for each of the display components.

8. The computer-implemented method of claim 1, and further comprising:
    receiving an indication of a user interaction, during runtime, that changes the environmental characteristic; and
    generating the user interface display based on the changed environmental characteristic.

9. The computer-implemented method of claim 1 wherein the component metadata for each display component comprises a plurality of different sets of modality metadata for the display component, each set of modality metadata indicating rendering instructions for rendering the display component on a different display modality.

10. The computer-implemented method of claim 9 wherein the plurality of different sets of modality metadata includes desktop metadata that has instructions for rendering the corresponding display component using a desktop display modality, tablet metadata that has instructions for rendering the corresponding display component using a tablet display modality, and telephone metadata that has instructions for displaying the corresponding display component using a telephone display modality.

11. The computer-implemented method of claim 9, and further comprising:
    selecting one of the different sets of modality metadata, for each display component, based on the display modality indicated by the environmental characteristic; and
    generating the user interface display based on the selected set of modality metadata.

12. The computer-implemented method of claim 1 wherein the environmental characteristic comprise a type of display device, a size of display screen, a display orientation, and input modalities corresponding to the display device, and wherein receiving an indication of the environmental characteristic comprises:
    interrogating a display device on which the user interface display is displayed for the environmental characteristic.

13. A computing system, comprising:
a layout transformation component configured to:
receive an environmental characteristic that indicates a display modality used for displaying a user interface display on a display device;
receive application metadata for an application having a plurality of display components, wherein the application metadata is indicative of rendering instructions for rendering each of the display components and comprises component priority metadata that indicates a display priority for the plurality of display components;
define a layout of the user interface display for rendering on the display modality, the layout comprising a canvas section configured to sequentially display the plurality of display components on the user interface display in response to a user input, wherein the layout transformation component defines an order for the sequential display of the plurality of display components based on the display priority for the plurality of display components; and
a user interface component configured to instruct the display device to display the user interface display.

14. The computing system of claim 13 and further comprising:
an application configured to identify particular display components to be rendered and a display priority for the display components.

15. The computing system of claim 13 and further comprising:
a transformation template data store configured to store transformation templates that include rendering instructions for rendering display components according to a plurality of different display modalities.

16. The computing system of claim 15 wherein the layout transformation component is configured to access the transformation template data store to obtain a particular one of the transformation templates, based on the environmental characteristic, and use the particular transformation template to render the plurality of display components.

17. The computing system of claim 13 wherein the display device comprises a touch-sensitive display device, the display modality comprises a touch modality used to display the user interface display on the touch-sensitive display device, and the user input comprises a user swipe gesture on the touch-sensitive display device.

18. The computing system of claim 17, wherein the user interface component is configured to:
instruct the touch-sensitive display device to display a first one of the display components with a highest display priority;
receive an indication of the user swipe gesture; and
instruct the touch-sensitive display device to switch from the display of the first display component to display a second one of the display components with a second highest display priority.

19. A computer-implemented method comprising:
identifying a set of display components;
receiving an indication of data bindings that bind data to the display components;
receiving an indication of an environmental characteristic indicative of a given display modality used to display the data;
selecting, based on the environmental characteristic indicative of the given display modality, a transformation template from a plurality of different transformation templates, each different transformation template including rendering instructions for rendering display components in a particular layout using a different display modality;
identifying a set of canvas sections for rendering the user interface display using the given display modality, and each canvas section has an associated display priority;
receiving component metadata, that is separate from the selected transformation template, for each of the identified display components, the component metadata including priority metadata indicating a priority of the identified display component;
defining a layout for a user interface display of the identified display components that displays the data bound to the identified display components, wherein defining the layout comprises selecting, for each of the canvas sections, a display component from the set of display components based on the display priority of the canvas section and the priority of the selected display component indicated by the priority metadata; and
generating rendering instructions for the user interface display.

* * * * *